(12) United States Patent
Combaneyre et al.

(10) Patent No.: US 12,293,213 B1
(45) Date of Patent: May 6, 2025

(54) RUNTIME CREATION OF CONTAINER IMAGES FOR EVENT STREAM PROCESSING

(71) Applicant: SAS Institute Inc., Cary, NC (US)

(72) Inventors: Frédéric Combaneyre, Sainte Colombe Pres Vernon (FR); Joydeep Bhattacharya, Pune (IN)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 18/989,920

(22) Filed: Dec. 20, 2024

(30) Foreign Application Priority Data

Jun. 11, 2024 (IN) .............................. 202411045105

(51) Int. Cl.
*G06F 9/455* (2018.01)
*G06F 8/61* (2018.01)

(52) U.S. Cl.
CPC ............ *G06F 9/45558* (2013.01); *G06F 8/63* (2013.01); *G06F 2009/45562* (2013.01); *G06F 2009/45575* (2013.01)

(58) Field of Classification Search
None
See application file for complete search history.

(56) References Cited

U.S. PATENT DOCUMENTS

2022/0253335 A1\* 8/2022 Bequet .................. G06N 3/084

OTHER PUBLICATIONS

"Container Builder," DeepStream Documentation 6, 26 pages.
"Supercharge Your Arm Builds With Docker Build Cloud: Efficiency Meets Performance," Infastructure Solutions Blog—Arm Community Blogs—Arm Community, Mar. 4, 2024, 13 pages.

\* cited by examiner

*Primary Examiner* — Bradley A Teets
*Assistant Examiner* — Melissa A Headly
(74) *Attorney, Agent, or Firm* — Bell & Manning, LLC

(57) ABSTRACT

A system and method include creating a project package for an Event Stream Processing (ESP) project, generating a first manifest file from the project package, creating a first container pod on a cluster based on the first manifest file, executing a container file generator software and a build kit software on the first container pod, executing an ESP server on the container file generator software, executing the ESP project on the ESP server such that data is not streaming to the ESP server, identifying a list of required software components needed to execute the ESP project, creating a container file having a subset of software components based on the list of required software components, generating a ESP project container image for the ESP server based on the container file, and deploying the ESP project using the ESP project container image to analyze data streamed to the ESP project.

30 Claims, 27 Drawing Sheets

1715 test.proc-map

/opt/sas/viya/home/SASEventStreamProcessingEngine/bin/dfesp_xml_server
/opt/sas/viya/home/SASEventStreamProcessingEngine/lib/libavro.so.23.0.0
/opt/sas/viya/home/SASEventStreamProcessingEngine/lib/libaws-c-common.so.1.0.0
/opt/sas/viya/home/SASEventStreamProcessingEngine/lib/libaws-c-event-stream.so.1.0.0
/opt/sas/viya/home/SASEventStreamProcessingEngine/lib/libaws-checksums.so
/opt/sas/viya/home/SASEventStreamProcessingEngine/lib/libaws-cpp-sdk-cognito-identity.so
/opt/sas/viya/home/SASEventStreamProcessingEngine/lib/libaws-cpp-sdk-core.so
/opt/sas/viya/home/SASEventStreamProcessingEngine/lib/libaws-cpp-sdk-identity-management.so
/opt/sas/viya/home/SASEventStreamProcessingEngine/lib/libaws-cpp-sdk-kinesis.so
/opt/sas/viya/home/SASEventStreamProcessingEngine/lib/libaws-cpp-sdk-kms.so
/opt/sas/viya/home/SASEventStreamProcessingEngine/lib/libaws-cpp-sdk-s3-encryption.so
/opt/sas/viya/home/SASEventStreamProcessingEngine/lib/libaws-cpp-sdk-s3.so
/opt/sas/viya/home/SASEventStreamProcessingEngine/lib/libaws-cpp-sdk-sts.so
/opt/sas/viya/home/SASEventStreamProcessingEngine/lib/libaws-cpp-sdk-transfer.so
/opt/sas/viya/home/SASEventStreamProcessingEngine/lib/libboost_filesystem.so.1.70.0
/opt/sas/viya/home/SASEventStreamProcessingEngine/lib/libboost_iostreams.so.1.70.0
/opt/sas/viya/home/SASEventStreamProcessingEngine/lib/libboost_system.so.1.70.0
/opt/sas/viya/home/SASEventStreamProcessingEngine/lib/libboost_zlib.so.1.70.0
/opt/sas/viya/home/SASEventStreamProcessingEngine/lib/libdfxesp_connectors.so
/opt/sas/viya/home/SASEventStreamProcessingEngine/lib/libdfxesp_c.so

FIG. 18

```
############################################
# Adding base Image
############################################
FROM expscr.azurecr.io/sas-esp-or-base/sas-esp-cr-base-ubi8-x86_64:latest
WORKDIR ./
USER root

############################################
# Copying model artifacts
############################################
RUN mkdir -p ./esp-project/home/{model,analytics,files,plugins,meta} && chown sas:sas ./esp-project/home/{
COPY --chown=sas:sas ./modelReader_onnx_yolov4_cpu/...../esp-project

############################################
# Installing required rpms
############################################
RUN --mount=type=bind,from=sas-event-stream-processing-content:latest,source=/pkgs/rpms,,target=/rpms/{ \
    cd ./rpms && \
    rpm -i --nodeps --noverify -v sas-espbase-7.44.3769-20231207.1701970949923.x86_64.rpm && \
    rpm -i --nodeps --noverify -v sas-tk-40.96.0-20231220.22535925477.0.x86_64.rpm && \
    rpm -i --nodeps --noverify -v sas-espconbase-7.44.3769-20231207.1701970949296.x86.64.rpm && \
    rpm -i --nodeps --noverify -v sas-espcondb-7.44.3769-20231207.1701970949299.x86.64.rpm && \
```

Container File

```
apiVersion: batch/v1
kind: Job
metadata:
    name: espcr-lua
spec:
    ttlSecondsAfterFinished: 100
    template:
        metadata:
            name: sequential-job
            annotations:
```
container.apparmor.security.beta.kubernetes.io/buildkitpod : unconfined container.seccomp.security.alpha.kubernetes.io/buildkitpod : unconfined
```
        spec:
            #nodeSelector:
                #kubernetes.io/hostname: espsc-kc5-n1.espstudio.sashq-d.openstack.sas.com
            securityContext:
                runAsUser: 1001
                fsGroup: 1001
                runAsGroup: 1001
            imagePullSecrets:
                - name: acr-secret
            initContainers:
            - image: espscr.azurecr.io/sas-espcr-base/sas-event-stream-processing-content:latest
                name: esp-content
                imagePullPolicy: Always
                command: ["cp","/pkgs/rpms/du-rpm-content.yml",'/home/sas/temp"]
                volumeMounts:
                    -name: datavolume
                    mountPath: /home/sas/temp
            - image: espscr.azurecr.io/espcr-image/espcr-dockerfile-creator:latest
                name: espcr-dockerfile-creator
                imagePullPolicy: Always
```

FIG. 26

RUNTIME CREATION OF CONTAINER IMAGES FOR EVENT STREAM PROCESSING

CROSS-REFERENCE TO RELATED APPLICATIONS

This application is a non-provisional of IN provisional application no. 202411045105, filed on Jun. 11, 2024, the entirety of which is incorporated by reference herein.

BACKGROUND

Containers allow running an application across multiple platforms and computing environments. A container image is a lightweight, standalone, and executable read-only executable file that is used to create a container. The container image may include the entire code, system libraries, tools, settings, etc. that are needed to run the container. The container image may be built in layers stacked together to form a final container image. The container image may be executed to create the container. The container is a runtime environment or instance of the container image.

Event Stream Processing (ESP) involves analyzing data streams in real-time. ESP projects may be used for ESP. An ESP project is implemented by using containers. An ESP project may include multiple components and artifacts that need to be managed, versioned, and deployed as a whole to execute the ESP project.

SUMMARY

In accordance with at least some aspects of the present disclosure, a non-transitory computer-readable medium having computer-readable instructions stored thereon is disclosed. The computer-readable instructions when executed by a processor cause the processor to receive a first request to create an Event Stream Processing (ESP) project; create a project package for the ESP project in response to the first request; receive a second request to create an ESP project container image for the ESP project; responsive to receiving the second request, generate a first manifest file from the project package; create a first container pod on a cluster based on the first manifest file; execute a container file generator software and a build kit software on the first container pod; execute an ESP server on the container file generator software; execute the ESP project on the ESP server, wherein data is not streaming to the ESP server during execution of the ESP project; responsive to executing the ESP project on the ESP server, identify a list of required software components needed to execute the ESP project; create a container file by the container file generator software, wherein the container file comprises a subset of software components based on the list of required software components; generate the ESP project container image for the ESP project by the build kit software for the ESP project based on the container file; and run the ESP project using the ESP project container image to analyze data streamed to the ESP project.

In accordance with at least some other aspects of the present disclosure, a system is disclosed. The system includes a memory having computer-readable instructions stored thereon and a processor that executes the computer-readable instructions to receive a first request to create an Event Stream Processing (ESP) project; create a project package for the ESP project in response to the first request; receive a second request to create an ESP project container image for the ESP project; responsive to receiving the second request, generate a first manifest file from the project package; create a first container pod on a cluster based on the first manifest file; execute a container file generator software and a build kit software on the first container pod; execute an ESP server on the container file generator software; execute the ESP project on the ESP server, wherein data is not streaming to the ESP server during execution of the ESP project; responsive to executing the ESP project on the ESP server, identify a list of required software components needed to execute the ESP project; create a container file by the container file generator software, wherein the container file comprises a subset of software components based on the list of required software components; generate the ESP project container image for the ESP project by the build kit software for the ESP project based on the container file; and run the ESP project using the ESP project container image to analyze data streamed to the ESP project.

In accordance with at least some other aspects of the present disclosure, a method is disclosed. The method includes receiving, by a processor executing computer-readable instructions stored on a memory, a first request to create an Event Stream Processing (ESP) project; creating, by the processor, a project package for the ESP project in response to the first request; receiving, by the processor, a second request to create an ESP project container image for the ESP project; responsive to receiving the second request, generating, by the processor, a first manifest file from the project package; creating, by the processor, a first container pod on a cluster based on the first manifest file; executing, by the processor, a container file generator software and a build kit software on the first container pod; executing, by the processor, an ESP server on the container file generator software; executing, by the processor, the ESP project on the ESP server, wherein data is not streaming to the ESP server during execution of the ESP project; responsive to executing the ESP project on the ESP server, identifying, by the processor, a list of required software components needed to execute the ESP project; creating, by the processor, a container file by the container file generator software, wherein the container file comprises a subset of software components based on the list of required software components; generating, by the processor, the ESP project container image for the ESP project by the build kit software for the ESP project based on the container file; and deploying, by the processor, the ESP project using the ESP project container image to analyze data streamed to the ESP project.

The foregoing summary is illustrative only and is not intended to be limiting in any way. In addition to the illustrative aspects, embodiments, and features described above, further aspects, embodiments, and features will become apparent by reference to the following drawings and the detailed description.

BRIEF DESCRIPTION OF THE DRAWINGS

FIG. 18 illustrates an example of a list of required software components, according to embodiments of the present technology.

FIG. 20 illustrates an example of a container file, according to embodiments of the present technology.

FIG. 26 illustrates an example of a first manifest file, according to embodiments of the present technology.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skills in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

Figure 1:
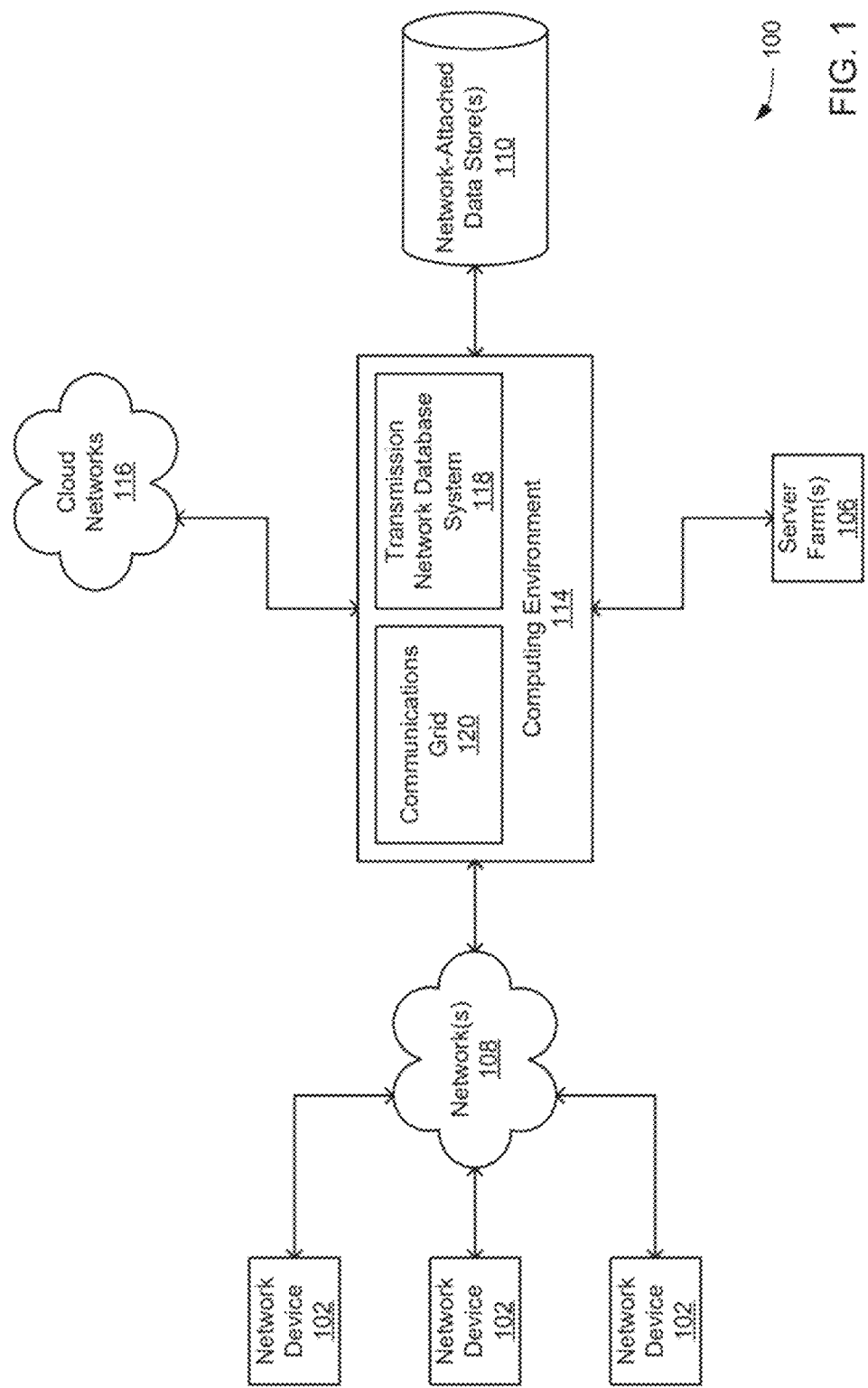
FIG. 1 illustrates a block diagram that provides an illustration of the hardware components of a computing system, according to some embodiments of the present technology.

FIG. 1 is a block diagram that provides an illustration of the hardware components of a data transmission network 100, according to embodiments of the present technology.

Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
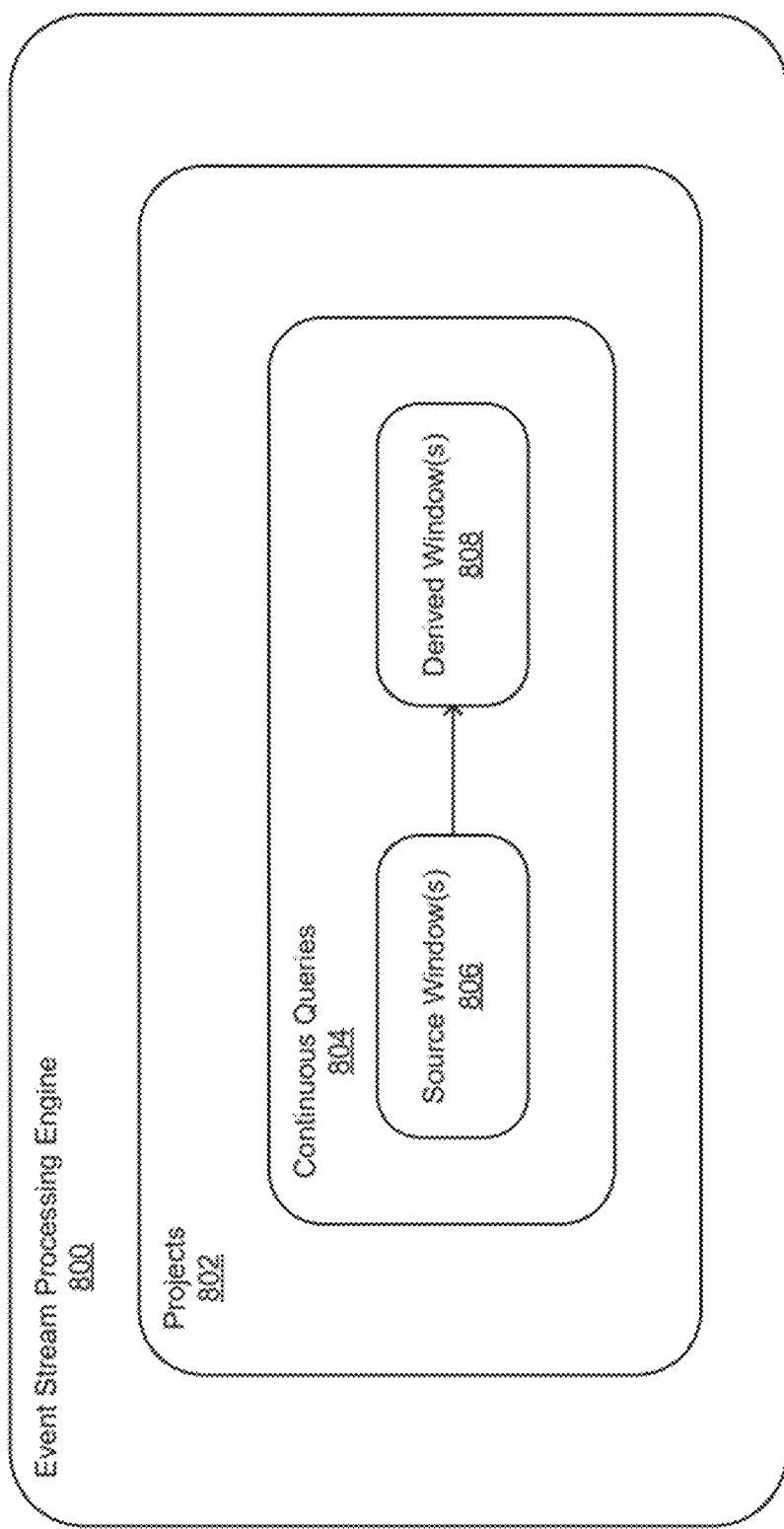
FIG. 8 illustrates a block diagram including components of an Event Stream Processing Engine (ESPE), according to embodiments of the present technology.
Figure 9:
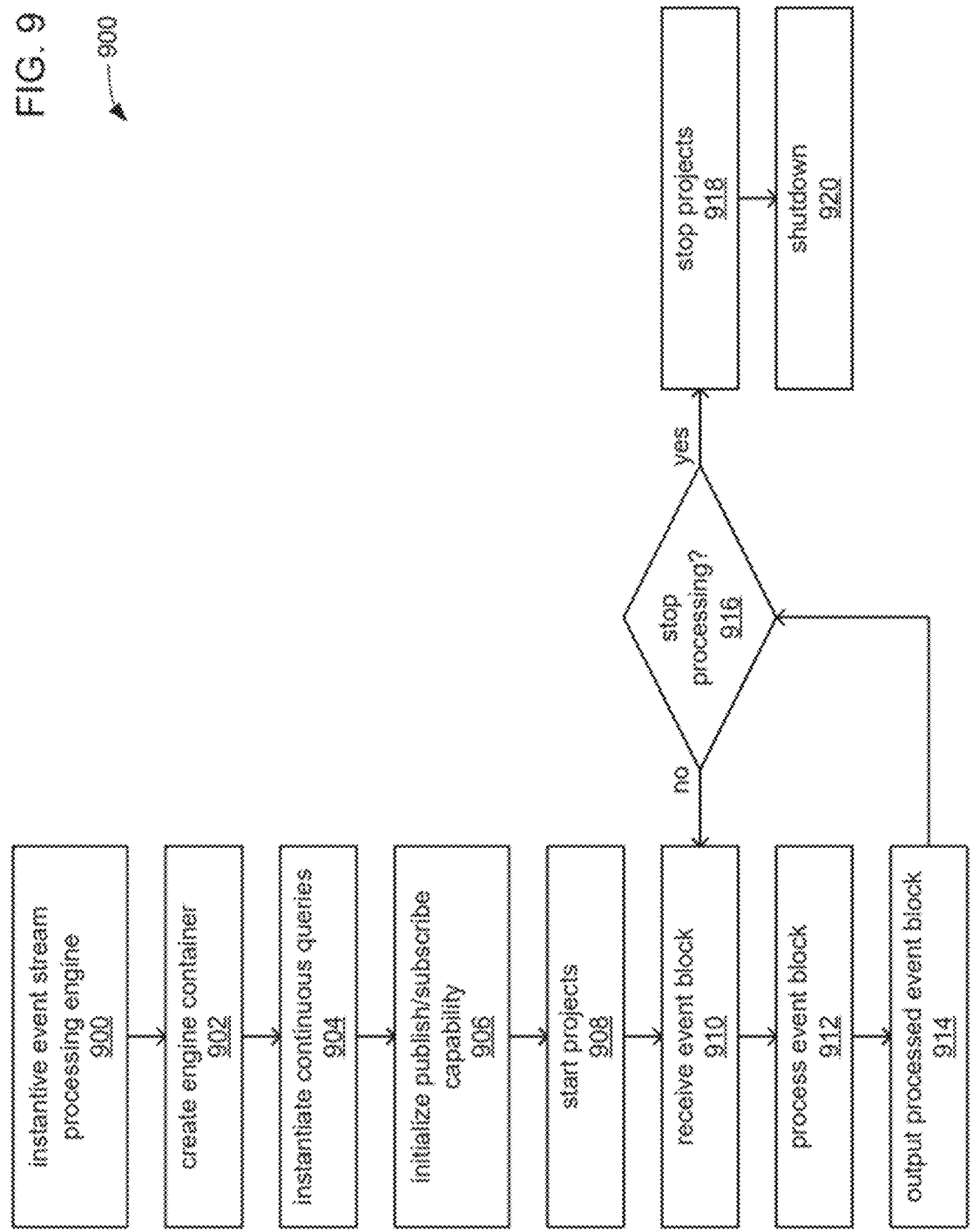
FIG. 9 illustrates a flow chart showing an example process including operations performed by an event stream processing engine, according to some embodiments of the present technology.
Figure 10:
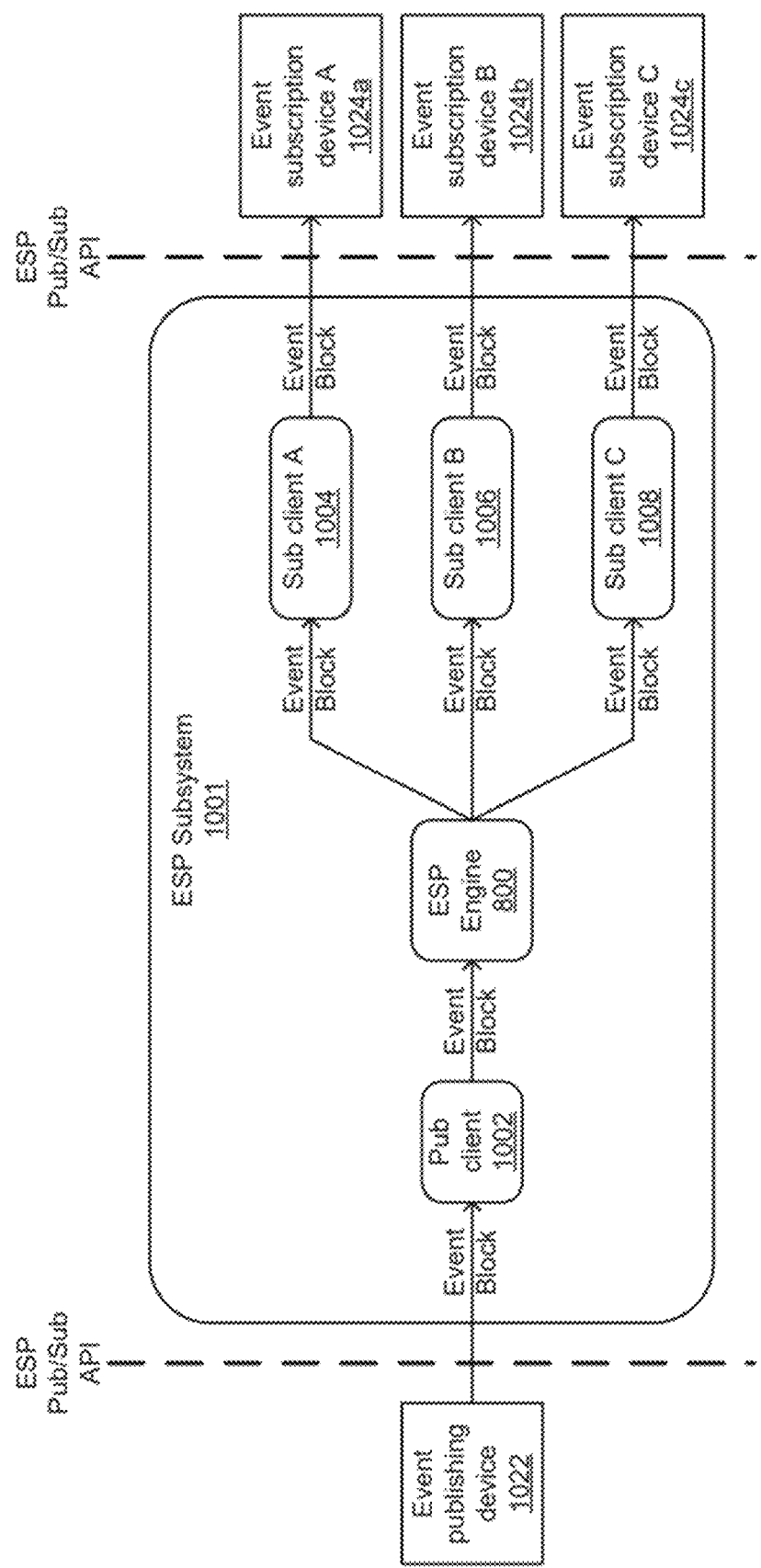
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
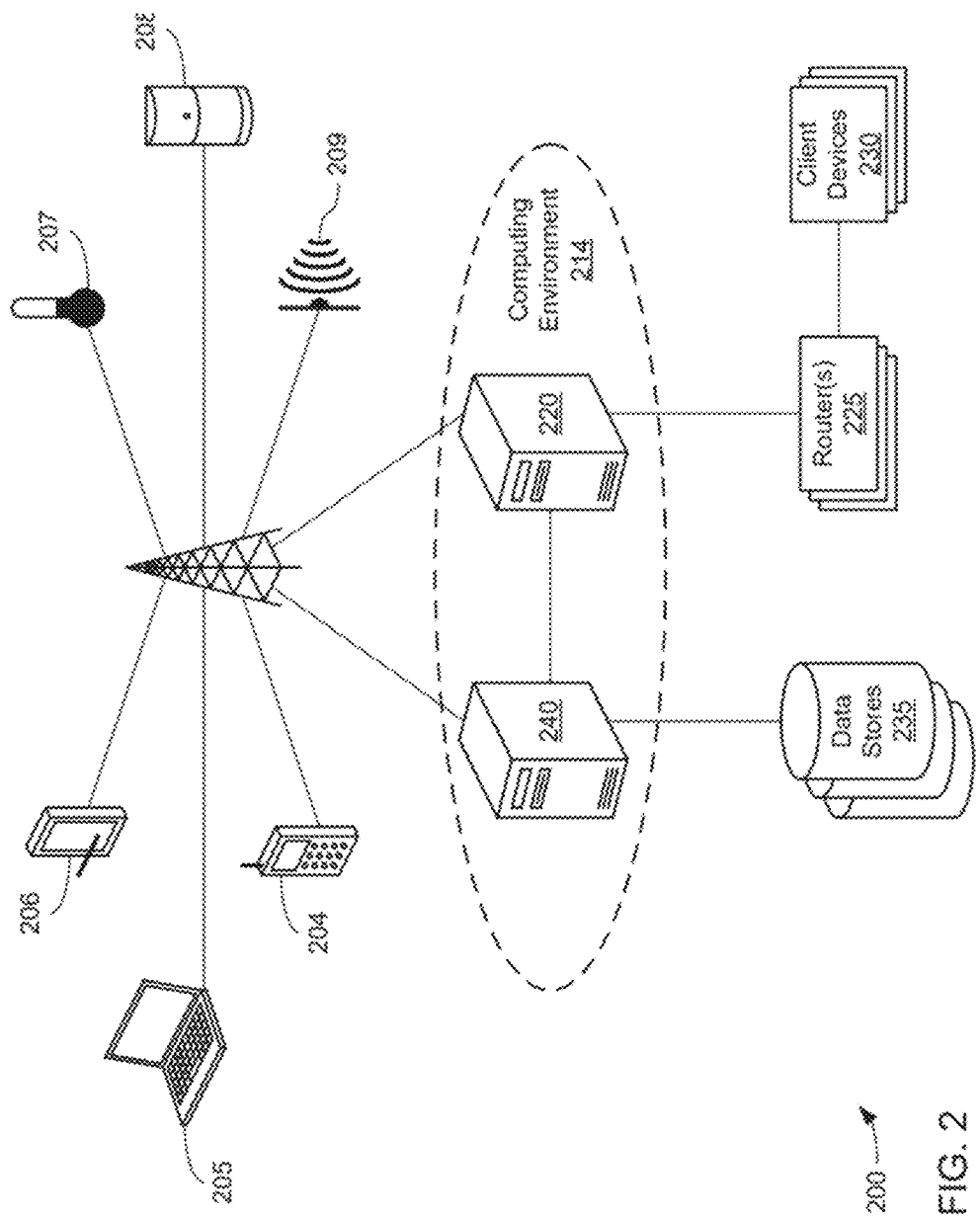
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
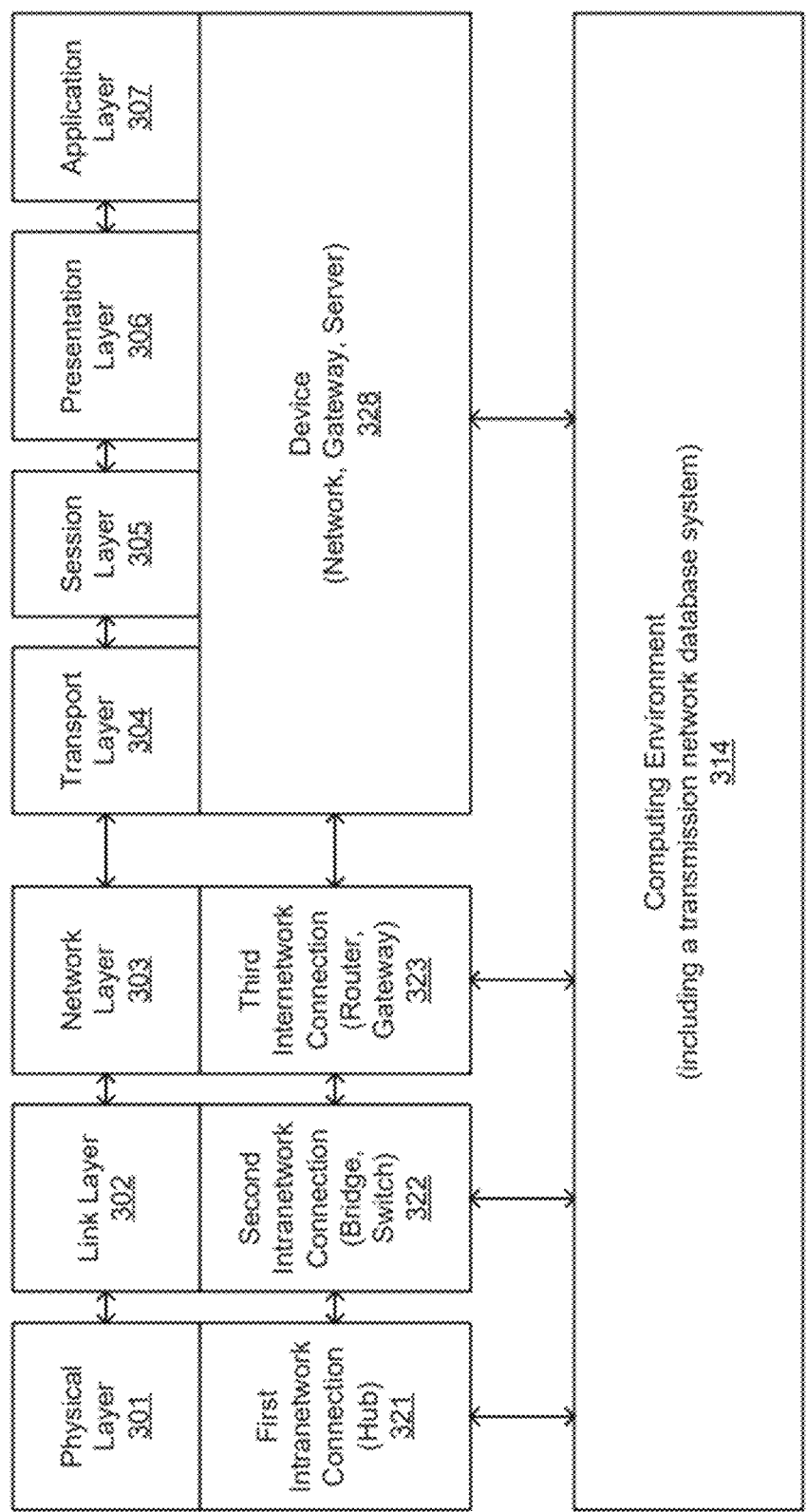
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in the same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
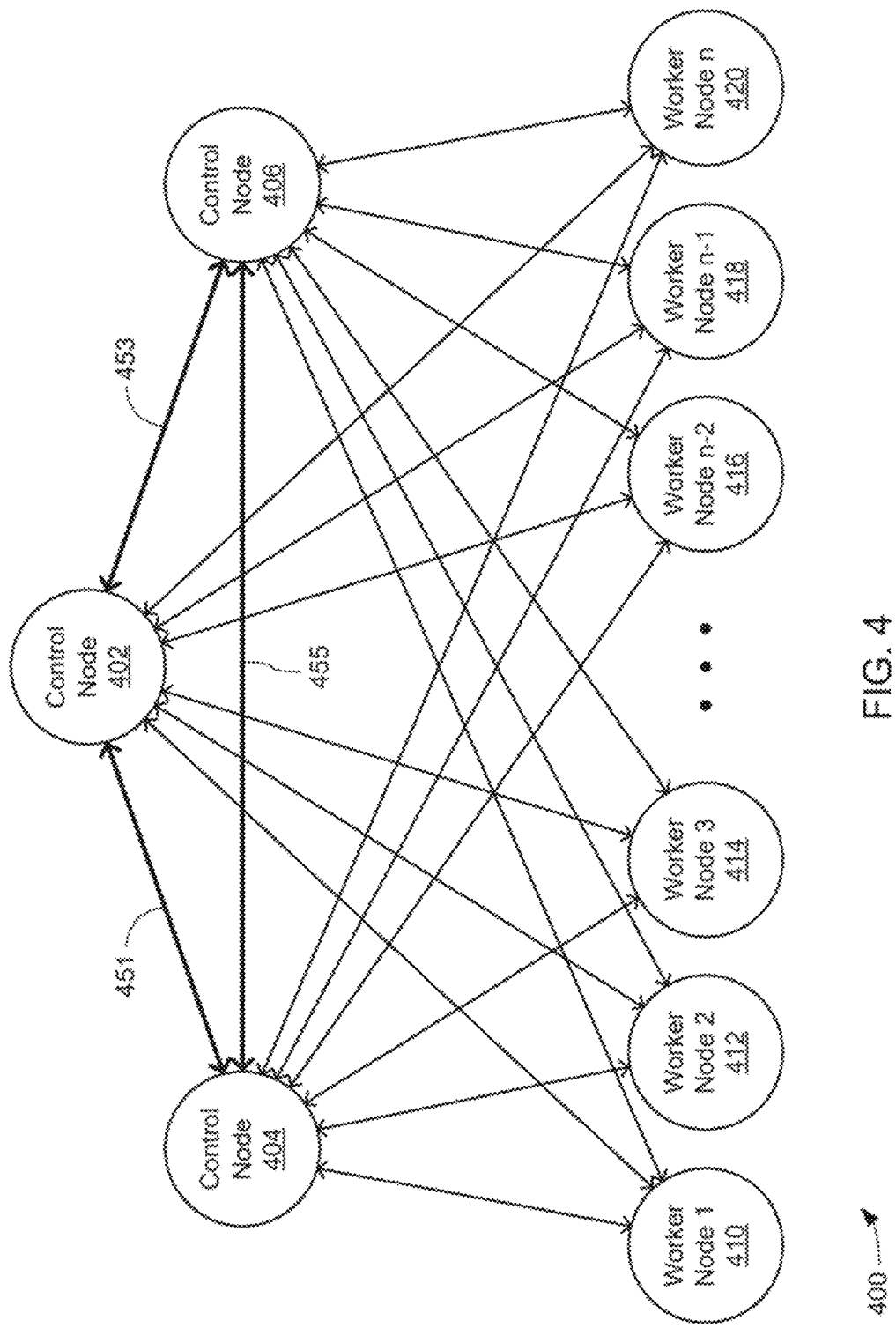
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
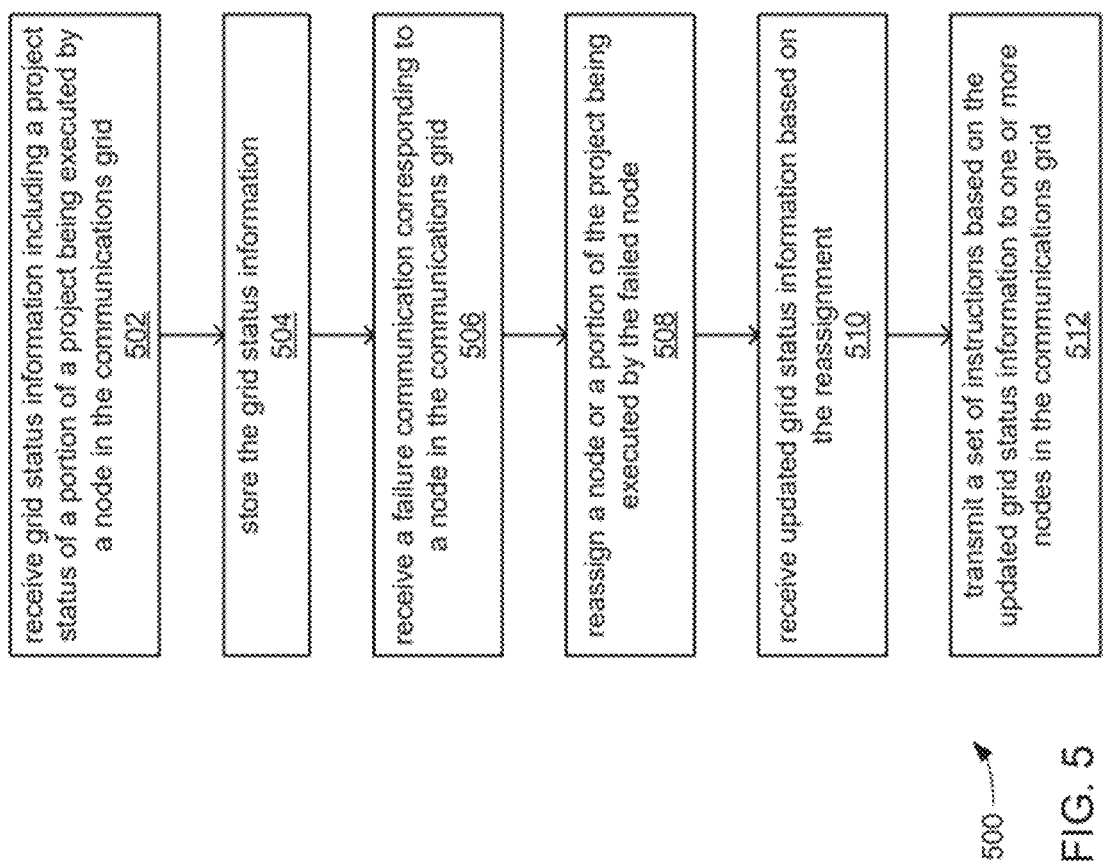
FIG. 5 illustrates a flow chart showing an example process for adjusting a communications grid or a work project in a communications grid after a failure of a node, according to some embodiments of the present technology.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
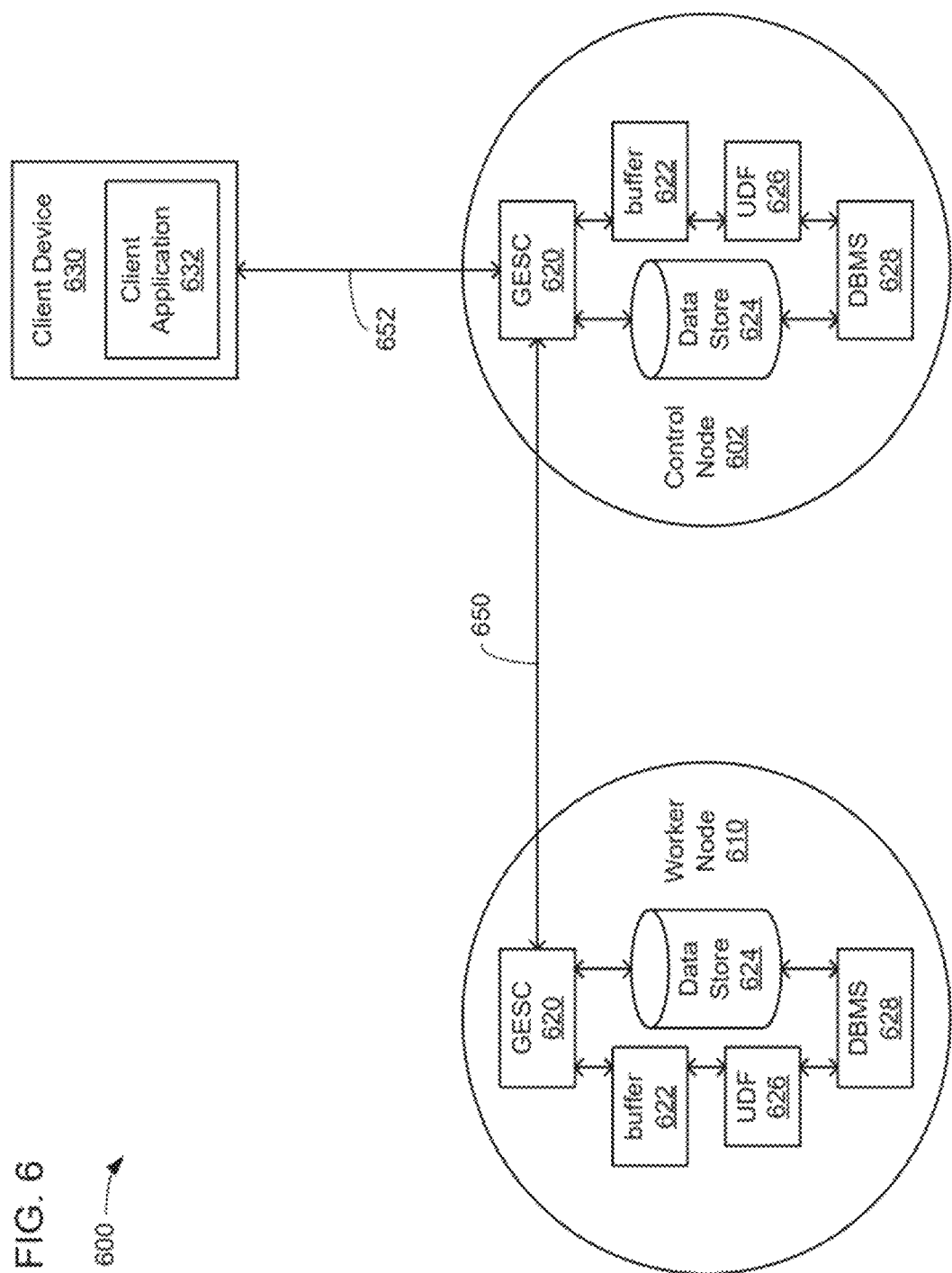
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a node 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
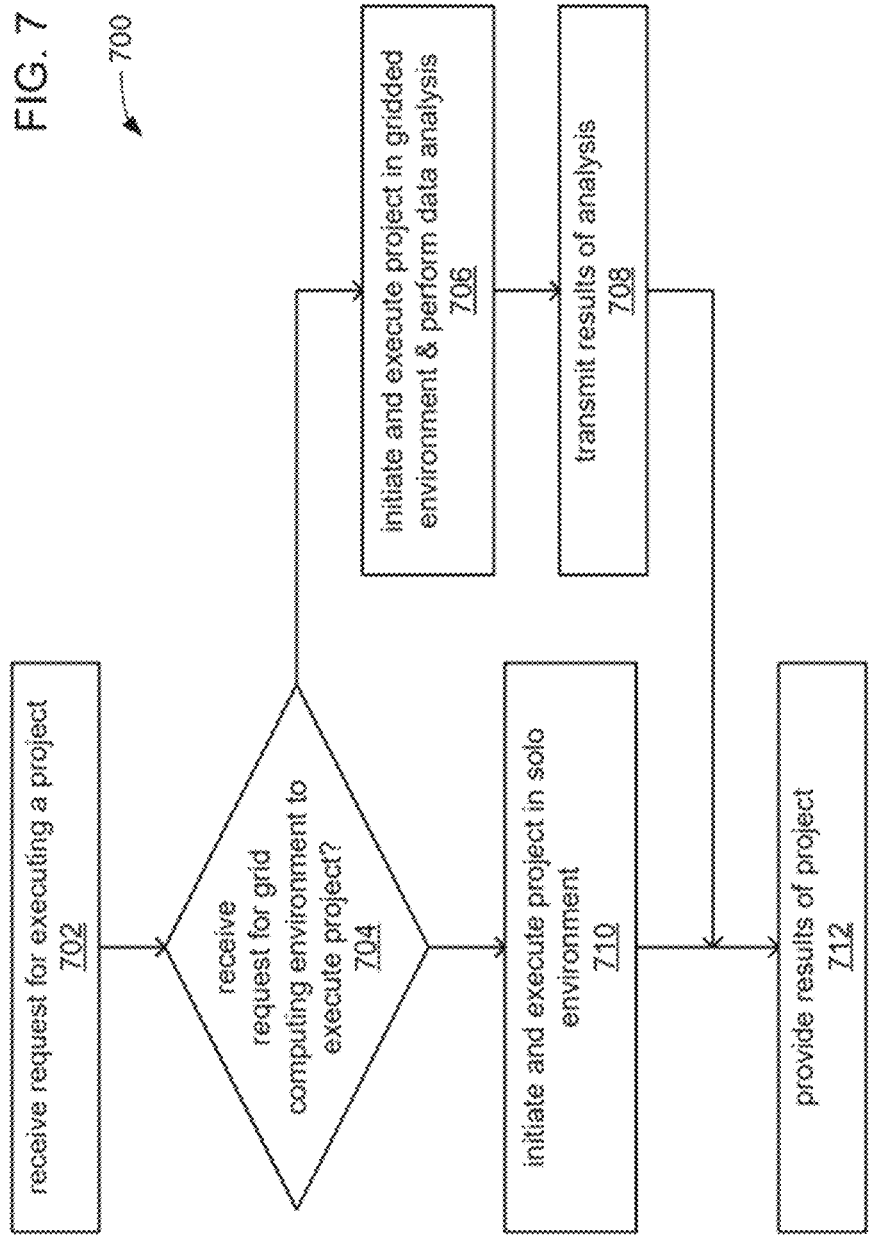
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 851, event publishing device 1022, an event subscribing device A 1024*a*, an event subscribing device B 1024*b*, and an event subscribing device C 1024*c*. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a*-*c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device.

The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
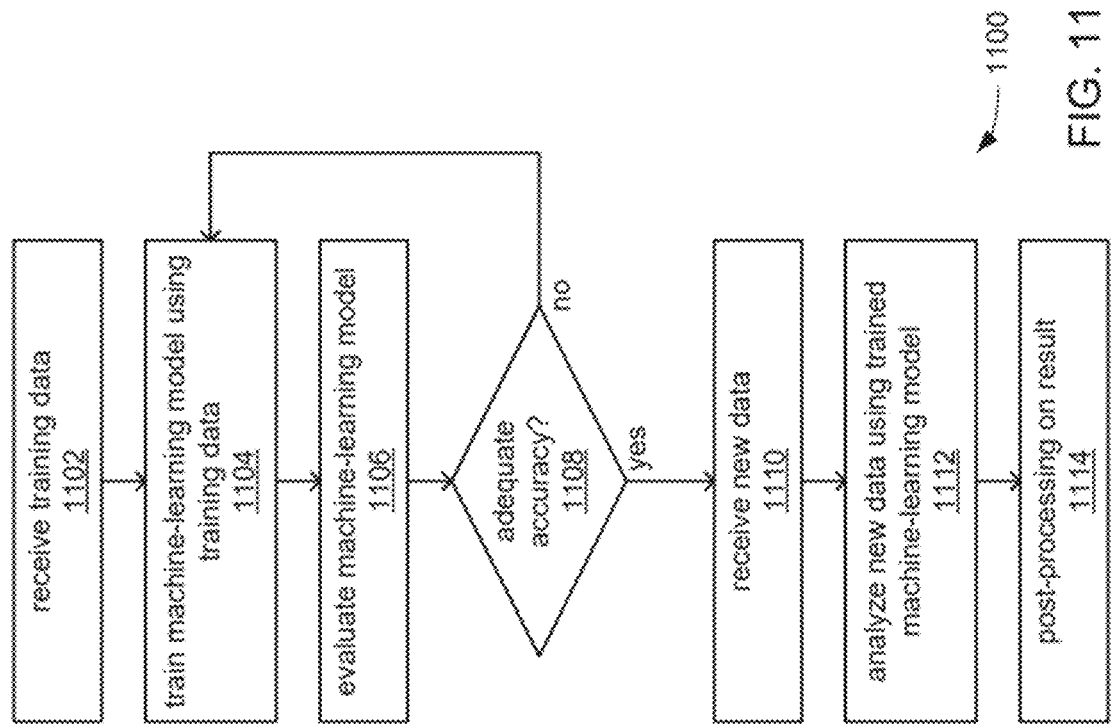
FIG. 11 illustrates a flow chart of an example of a process for generating and using a machine-learning model according to some aspects, according to embodiments of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these. Other networks may include transformers, large language models (LLMs), and agents for LLMs.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at 1108, the machine-learning model has an inadequate degree of accuracy for a particular task, the process can return to block 1104, where the machine-learning model can be further trained using additional training data or otherwise modified to improve accuracy. However, if, at 1108, the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
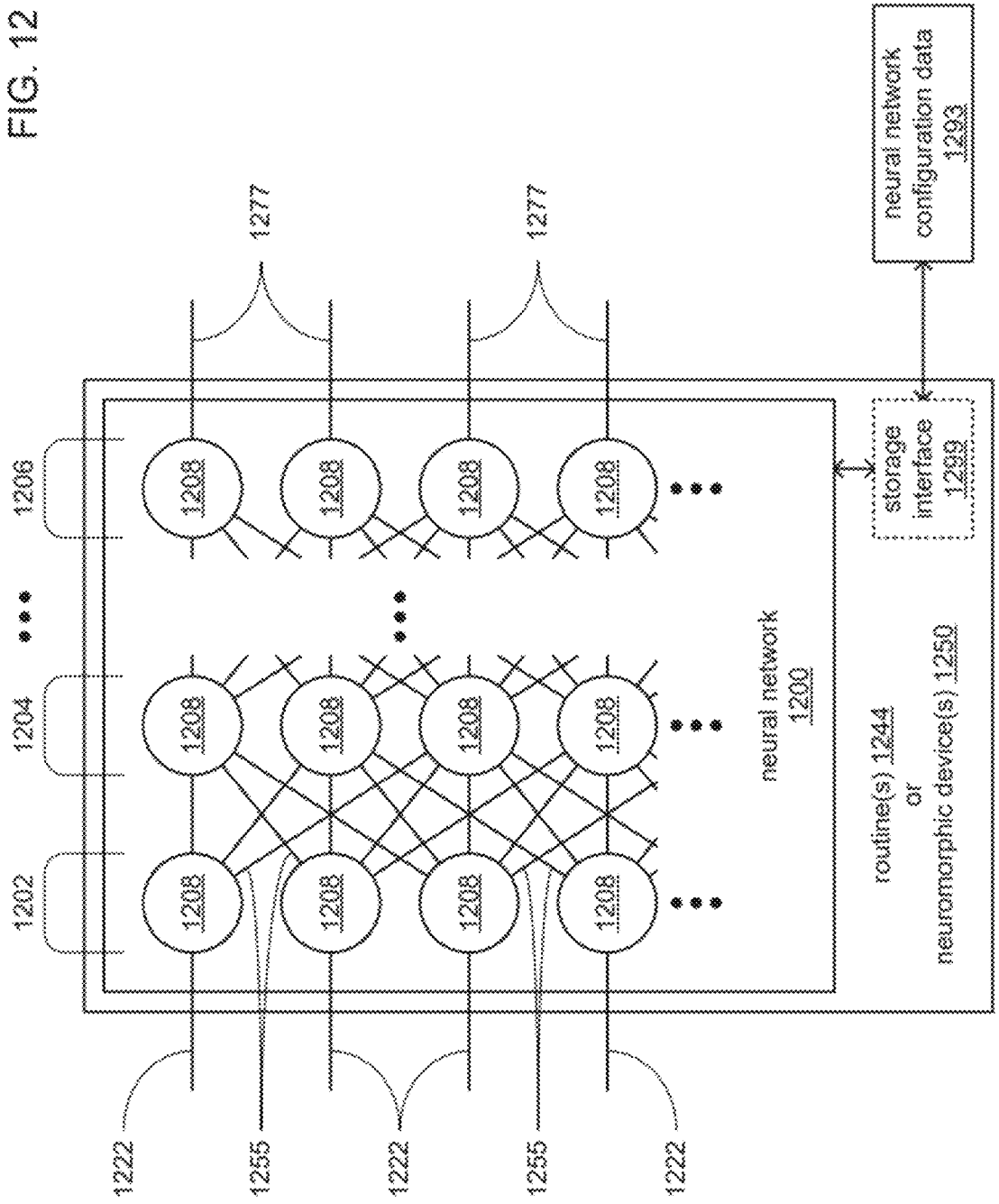
FIG. 12 illustrates an example of a machine-learning model as a neural network, according to embodiments of the present technology.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y = \max(x, 0)$ where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyper parameters of the neural network 1200 may be stored and/or retrieved. More specifically, the neural network configuration data 1293 may include such parameters as weighting and/or biasing values derived through the training of the neural network 1200, as has been described. Alternatively or additionally, the neural network configuration data 1293 may include such hyperparameters as the manner in which the neurons 1208 are to be interconnected (e.g., feedforward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network and/or a transformer model to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide(GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
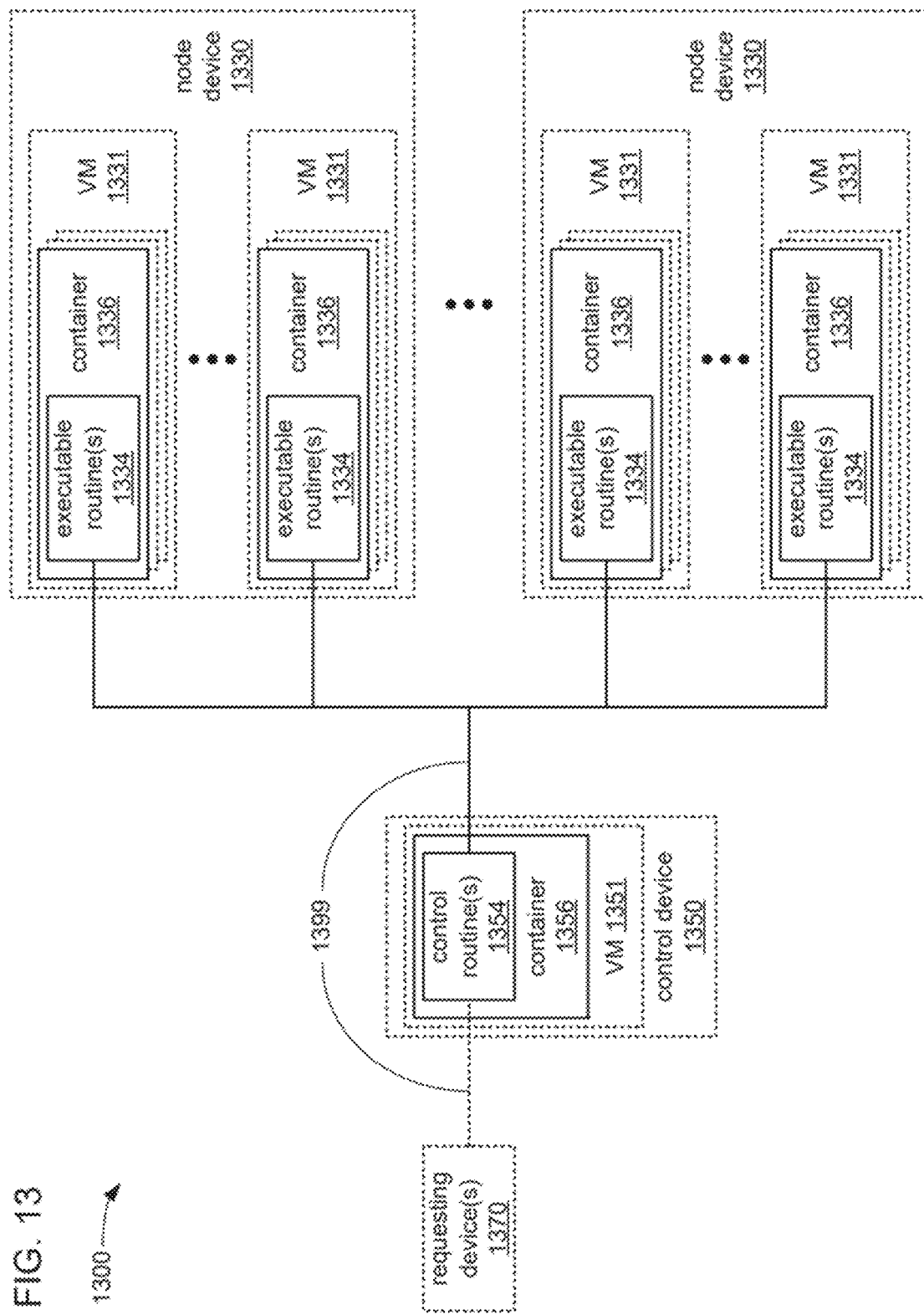
FIG. 13 illustrates various aspects of the use of containers as a mechanism to allocate processing, storage and/or other resources of a processing system to the performance of various analyses, according to embodiments of the present technology.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforedescribed grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to affect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1300 to each VM 1331 and/or container 1336 that is instantiated therein. Thus, it may be the control device(s) 1350 that effects a nested allocation of resources, such as the aforedescribed example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions. By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transaction to better ensure that either all of each such transaction is either entirely performed or is entirely not performed. As will be familiar to those skilled in the art, allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies, and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Cloud Native Computing Foundation of San Francisco, CA, USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively or additionally, such supporting routines may serve to provide access to one or more storage repositories (not specifically shown) in which at least data objects may be stored for use in performing the requested analyses.

The present disclosure is directed to ESP and particularly to creating ESP project container images for ESP servers that run ESP projects. An overview of ESP is provided in FIGS. 8-10. As explained above, an ESP project may be used to analyze data and includes one or more continuous queries represented by a directed graph. The continuous queries are indicative of data flows, which include data transformations and analysis of incoming data streams in real-time. Thus, depending upon the nature of the continuous queries, each ESP project may be designed to perform a particular one or more set of operations. Each continuous query may have a unique name and may include one or more source windows. Each source window may be connected by an edge to one or more derived windows. The derived windows may be configured to detect patterns in data, transform data, aggregate data, analyze data, perform computations on data, etc. A derived window may be connected to other derived windows. In some embodiments, each derived window may be configured to perform a single type of operation. In other embodiments, a derived window may perform multiple types of operations. The edges that connect the windows (whether source or derived) may have an associated direction indicating the order in which the windows are to be traversed. An ESP project may specify a container that holds the one or more continuous queries.

An ESP studio may be used to create, view, edit, upload, download, delete, and otherwise manage ESP projects. Each ESP project may be associated with an ESP engine and each instance of ESP engine is referred to herein as an ESP server. In other words, an ESP server is an engine executable that instantiates and executes an ESP project. An ESP project is composed of multiple components and artifacts that are managed, versioned, and deployed as a whole. For example, an ESP project may include an XML (Extensible Markup Language) model that defines how the ESP server processes and analyzes streaming data. In some embodiments, the XML model may include information about where the streaming data is coming from (e.g., identify data sources), information about how to process the streaming data (e.g., analyzing, transforming, filtering, etc.), and information about where to output the processed streaming data to (e.g., identify output destinations). In some embodiments, the XML model may include other or additional information. In some embodiments, the XML model may be created in the ESP studio when the ESP project is created.

An ESP project may also include an ASTORE (Analytic Store) file, which is a binary file that contains a pretrained analytical model. The ASTORE file may be used to store the analytical model, which may be deployed when the associated ESP project is deployed. In some embodiments, the ASTORE file may be imported into the ESP server, allowing the ESP server to use the pretrained analytical model for processing the streaming data, for example, to generate insights or predictions.

An ESP project may further include an ONNX (Open Neural Network Exchange) file. An ONNX file is a file format used to store machine learning models. An ONNX file may allow machine learning models trained in different frameworks to be used interchangeably. When an ESP project is deployed, the ESP server may import the ONNX machine learning models for processing the streaming data, for example, to generate insights or predictions. ONNX machine learning models may be particularly suitable for high-throughput, low-latency applications.

An ESP project may include a Python code file. A Python code file may be a script in Python that the ESP server may use to define and execute various tasks related to processing the streaming data. For example, the ESP server may execute the Python script to process incoming data streams, to interface and interact with the data sources, data destinations, the analytical model, etc., as well as to implement custom logic and complex operations specific to a use case. The ESP server may also use the Pythion script to process the streaming data continuously as the data arrives to provide the real-time insights and actions.

An ESP project may also include one or more Python libraries and plugins to extend the functionality of the ESP server and integrate custom processing logic. Python plugins may be modules that may be dynamically loaded by the ESP server at runtime. These plugins may enable the ESP server to perform specific tasks such as data transformations, analytics, etc. These plugin modules may use Python libraries to leverage existing functionalities.

An ESP project may define custom connectors that allow the ESP server to interface with various data sources and data destinations that may not be supported by a particular computing environment, thereby facilitating seamless data flow and processing.

An ESP project may also include parameter files that define configurations and settings for the ESP server. These settings and configurations may be used to customize the operation of the ESP server. In some embodiments, the ESP project may include other tools, libraries, software plugins, components, etc. Thus, the ESP project is a combination of various components and artifacts. As more and more functionality is desired or added for the ESP server to perform, the number of components and artifacts in the ESP project is increased.

The ESP project may be associated with an ESP server image for the ESP server. The ESP server image may be created using Linux package manager components (e.g., RPM (Red Hat Package Manager) components) to manage the installation, update, and/or removal of software packages during the creation of the ESP server for the ESP project. The Linux package manager components may be used to install necessary software components on the ESP server during the creation of the ESP server for the ESP project. By installing the necessary software components, dependencies and configurations may be correctly set up to allow the ESP server to execute properly. In some embodiments, the software components may be software libraries including a collection of pre-written code, procedures, or scripts that may be used to execute the ESP project. The Linux package manager components may also allow for easy updates to software, for example, to install security patches. In some embodiments, the Linux package manager components may also be used to handle dependencies automatically, ensuring that all required libraries, software tools, etc. are installed alongside the main software package of the ESP server. Thus, the Linux package manager components may be used to ensure a consistent installation and execution of the ESP server across different systems while reducing the likelihood of errors.

For a typical x86 architecture, there are at least 96 Linux package manager components. Each of these 96 Linux package manager components has associated therewith a plurality of software libraries and files. Currently, when an ESP server image is created, all of these 96 Linux package manager components (including all of the libraries and files associated with each of the 96 Linux package manager components) are packaged into the ESP server image. This is done because different ESP projects may require different Linux package manager components (and therefore various libraries and files) and the specific Linux package manager components that a particular ESP project may need may be unknown at the time of ESP project (and ESP server image) creation. For example, if the ESP Project is for advanced analytics, a specific set of libraries and files may be needed. If the ESP project requires advanced computing, then another set of libraries and files may be needed. While it may be known at ESP project creation time, for example, that the ESP project is for advanced analytics, the set of libraries and files that may be needed for performing those advanced analytics may be unknown until ESP server execution time. In particular, the set of libraries and files may not be exposed to an end user. However, without the set of libraries and files, the ESP project cannot run.

Therefore, to avoid the situation where required libraries and files are not present in the ESP server image, all 96 Linux package manager components (and each of their libraries and files) may be packaged within the ESP server image even though only a small subset of those Linux package manager components (and their libraries and files) may be needed for executing the ESP project. For example, even if an ESP project needs only 6 of the 96 Linux package manager components, the ESP server image may include all 96 Linux package manager components (and their libraries and files) because the ESP project may not know until runtime which of the 6 Linux package manager components are needed. As a result, the ESP server images are static images of very large sizes. Further, as the number of libraries and files in each Linux package manager component grows, the size of the ESP server image grows even more. Currently, a typical size of an ESP server image is around 10 GB or more.

Such large sizes for the ESP server image are undesirable. For example, executing such large server images requires more computing resources (e.g., more memory) to store all of the Linux package manager components whether they are being used or not. The speed of execution may also reduce, thereby increasing latency of processing the streaming data and reducing throughput. Thus, the large sized ESP images lead to wastage of computing resources as well as reducing how much streaming data may be processed in a given period of time. The larger size of the ESP server images may also increase image pull times because larger images may require longer to pull. An image pull time refers to the duration to download a container image (e.g., fetching all the layers of the container image and assembling the layers into an executable container) from a registry to a local environment (e.g., a node). Because the image layers are downloaded over a network, larger images consume more network resources as well.

Larger size of the ESP server images may also increase pod startup times. Containers may be deployed in container pods. Each container pod may have one or more containers. ESP projects may be executed within a container pod. In some embodiments, a new container pod may be created for each ESP project. Larger the size of the ESP server image, slower is the startup of the container pod. Further, larger ESP server images may adversely impact deployment efficiency and application scalability of the ESP server/ESP project. When deploying an ESP server container, the ESP server image needs to be pulled from a container registry if not already present on the node. Larger ESP server images may require longer time to pull (e.g., download) from the container registry. Similarly, if multiple instances of the ESP project are to be deployed on multiple nodes, each node may be required to pull the ESP server image from the container registry, thereby compounding the increased pull times and overall slowing down the performance of the computing system.

In addition to the problems mentioned above, promotion of these ESP server images is a problem given the large size of the ESP server image. For example, an ESP project may be created in a development environment. To test the ESP project, that ESP project may need to be "promoted" to the quality & assurance environment or testing environment. When the ESP project is ready for deployment, the ESP project may be "promoted" to a production environment. When the ESP project is promoted to a different environment, the associated ESP server image may need to be promoted to the different environment as well to allow the ESP project to run in that different environment. The large size of the ESP server image creates problems when promoting the ESP server image from one environment to another. Promoting the ESP server image may require storing the ESP server image in the different environments, thereby increasing the overall storage requirements.

An approach to reducing the size of the ESP server image includes creating multiple base images. Each base image may include a subset of the 96 Linux package manager components (and their libraries and files) depending upon a particular project type. For example, for advanced analytics projects, the base image may include a subset of the 96 Linux package manager components that a user believes may be required for executing the advanced analytics project. If during runtime, a required Linux package manager component is found to be missing, execution of the ESP project may fail. Further, for various flavors of a particular type of ESP project, multiple base images may exist. For example, for an advanced analytics project in a health care application, a first base image having a first subset of the 96 Linux package manager components may be created, while for an advanced analytics project in a finance application, a second base image having a second subset of the 96 Linux package manager components may be created, and so on. Further, even within a particular application, additional nuances may require creating multiple base images. For example, advanced analytics for a first type of predictions may have a first base image, a second type of predictions may have a second base image, generating insights may have a third base image, pattern matching may have a fourth base image, and so on. Thus, depending upon the ESP project, multiple base images may exist and the burden is on the user to select the right base image for the ESP project. If the user does not pick the right base image during ESP project creation time, the ESP project at runtime may fail. Further, all of these base images need to be stored, maintained, and continuously updated, which again leads to wastage of computing resources (e.g., increased memory usage due to storing all the base images).

Therefore, having predefined base ESP server images to create ESP server images for ESP projects is undesirable and suffers from technical problems (e.g., unduly large size, increased memory consumption, increased latency, reduced throughout, risk of ESP project failure, etc.). Accordingly, the present disclosure provides technical solutions to these technical problems. In particular, instead of creating the ESP server image during creation of the ESP project, the present disclosure provides technical solutions to create the ESP server image (e.g., an ESP project container image) at a later time when the development of the ESP project is finished, and the ESP project has been tested and is ready for deployment. The proposed approach finds out, by internally running the ESP project, the minimum set of the 96 Linux package manager components (and their libraries and files) that are actually needed by the ESP server to run the ESP project before ESP project deployment and then creates a the ESP project container image for the ESP project based on only the minimum subset of the 96 Linux package manager components (and their libraries and files). For example, if during runtime, only 6 of the 96 Linux package manager components (and their libraries and files) are needed for running the ESP server/ESP project, the ESP project container image is created with only the 6 Linux package manager components (and their libraries and files) and the ESP project is deployed with the ESP project container image having the 6 Linux package manager components (and their libraries and files).

By optimizing the size of the ESP project container image (e.g., by creating the ESP project container image with only the required Linux package manager components (and their libraries and files), the proposed approach promotes a more efficient use of computing resources. For example, increased memory storage is not needed due to the reduced size of the ESP project container image, image pull times are reduced, fewer network resources are used, computing speed is increased, container pod startup time is reduced, and deployment and application efficiency is improved. The proposed approach also does not require creating, maintaining, and updating the multiple base images discussed above. Instead of creating static ESP server images, the proposed approach creates dynamic ESP project container images with only Linux package manager components (and their libraries and files) that are needed by a particular ESP project, thereby tailoring the ESP server image to the particular ESP project.

Figure 14:
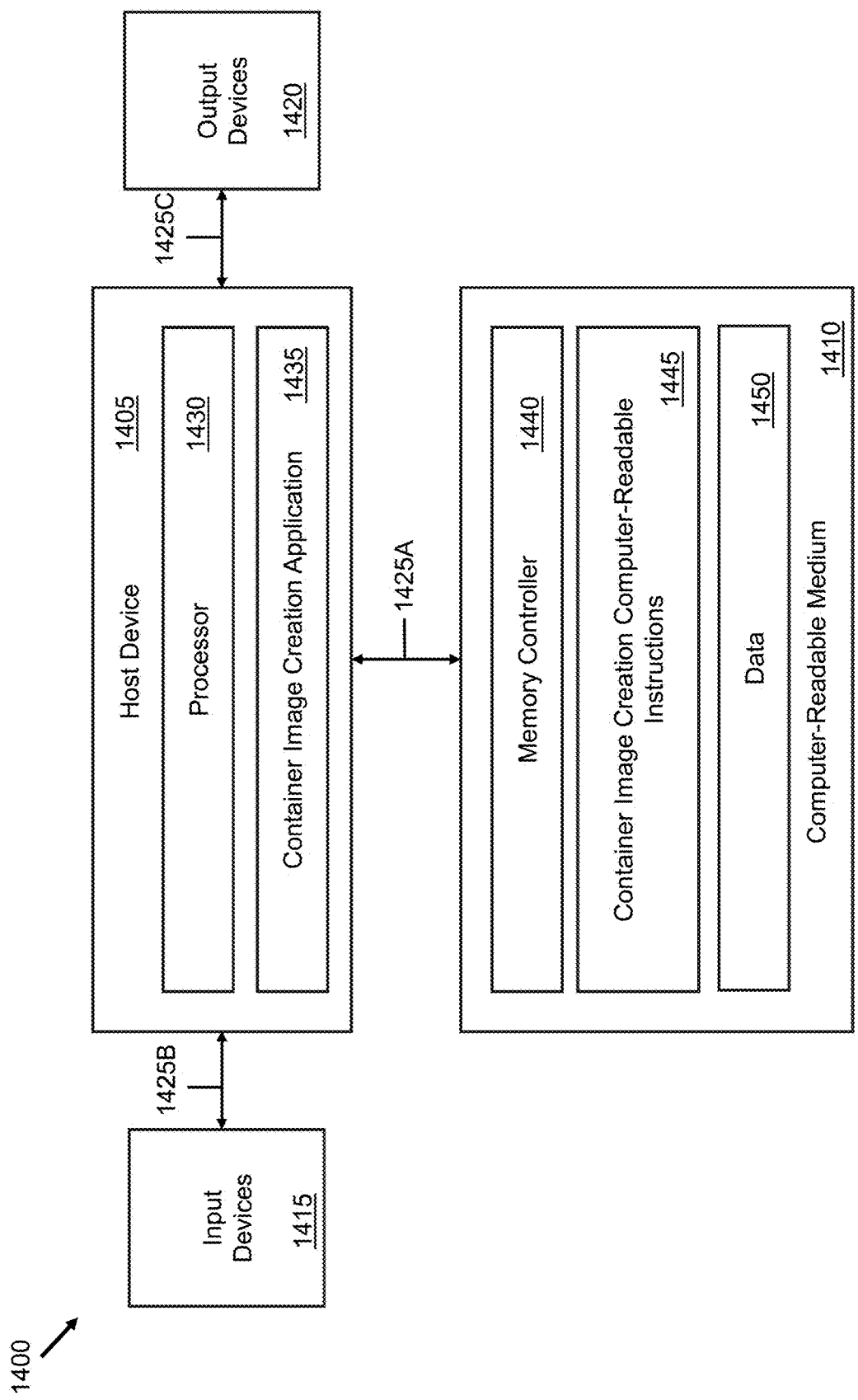
FIG. 14 illustrates a block diagram of an example container image creation system, according to embodiments of the present technology.

Turning now to FIG. 14, a block diagram of an example container image creation system 1400 is shown, in accordance with some embodiments of the present disclosure. The container image creation system 1400 may be part of, or otherwise associated with, the computing environment 114. The container image creation system 1400 includes a host device 1405 associated with a computer-readable medium 1410. The host device 1405 may be configured to receive input from one or more input devices 1415 and provide output to one or more output devices 1420. The host device 1405 may be configured to communicate with the computer-readable medium 1410, the input devices 1415, and the output devices 1420 via appropriate communication interfaces, buses, or channels 1425A, 1425B, and 1425C, respectively. The container image creation system 1400 may be implemented in a variety of computing devices such as computers (e.g., desktop, laptop, etc.), servers, tablets, personal digital assistants, mobile devices, wearable computing devices such as smart watches, other handheld or portable devices, or any other computing units suitable for performing operations described herein using the host device 1405.

Further, some or all of the features described in the present disclosure may be implemented on a client device, an on-premise server device, a cloud/distributed computing environment, or a combination thereof. Additionally, unless otherwise indicated, functions described herein as being performed by a computing device (e.g., the container image creation system 1400) may be implemented by multiple computing devices in a distributed environment, and vice versa.

The input devices 1415 may include any of a variety of input technologies such as a keyboard, stylus, touch screen, mouse, track ball, keypad, microphone, voice recognition, motion recognition, remote controllers, input ports, one or more buttons, dials, joysticks, point of sale/service devices, card readers, chip readers, and any other input peripheral that is associated with the host device 1405 and that allows an external source, such as a user, to enter information (e.g., data) into the host device and send instructions to the host device 1405. Similarly, the output devices 1420 may include a variety of output technologies such as external memories, printers, speakers, displays, microphones, light emitting diodes, headphones, plotters, speech generating devices, video devices, and any other output peripherals that are configured to receive information (e.g., data) from the host device 1405. The "data" that is either input into the host device 1405 and/or output from the host device may include any of a variety of textual data, numerical data, alphanumerical data, graphical data, video data, sound data, position data, combinations thereof, or other types of analog and/or digital data that is suitable for processing using the container image creation system 1400.

The host device 1405 may include a processor 1430 that may be configured to execute instructions for running one or more applications associated with the host device 1405. In some embodiments, the instructions and data needed to run the one or more applications may be stored within the computer-readable medium 1410. The host device 1405 may also be configured to store the results of running the one or more applications within the computer-readable medium 1410. One such application on the host device 1405 may be a container image creation application 1435. The container image creation application 1435 may be used to automatically generate simulated data.

The container image creation application 1435 may be executed by the processor 1430. The instructions to execute the container image creation application 1435 may be stored within the computer-readable medium 1410. To facilitate communication between the host device 1405 and the computer-readable medium 1410, the computer-readable medium may include or be associated with a memory controller 1440. Although the memory controller 1440 is shown as being part of the computer-readable medium 1410, in some embodiments, the memory controller may instead be part of the host device 1405 or another element of the container image creation system 1400 and operatively associated with the computer-readable medium 1410. The memory controller 1440 may be configured as a logical block or circuitry that receives instructions from the host device 1405 and performs operations in accordance with those instructions. For example, to execute the container image creation application 1435, the host device 1405 may send a request to the memory controller 1440. The memory controller 1440 may read the instructions associated with the container image creation application 1435. For example, the memory controller 1440 may read simulated data generation computer-readable instructions 1445 stored within the computer-readable medium 1410 and send those instructions back to the host device 1405. In some embodiments, those instructions may be temporarily stored within a memory on the host device 1405. The processor 1430 may then execute those instructions by performing one or more operations called for by those instructions.

The computer-readable medium 1410 may include one or more memory circuits. The memory circuits may be any of a variety of memory types, including a variety of volatile memories, non-volatile memories, or a combination thereof. For example, in some embodiments, one or more of the memory circuits or portions thereof may include NAND flash memory cores. In other embodiments, one or more of the memory circuits or portions thereof may include NOR flash memory cores, Static Random Access Memory (SRAM) cores, Dynamic Random Access Memory (DRAM) cores, Magnetoresistive Random Access Memory (MRAM) cores, Phase Change Memory (PCM) cores, Resistive Random Access Memory (ReRAM) cores, 3D XPoint memory cores, ferroelectric random-access memory (FeRAM) cores, and other types of memory cores that are suitable for use within the computer-readable medium 1410. In some embodiments, one or more of the memory circuits or portions thereof may be configured as other types of storage class memory ("SCM"). Generally speaking, the memory circuits may include any of a variety of Random Access Memory (RAM), Read-Only Memory (ROM), Programmable ROM (PROM), Erasable PROM (EPROM), Electrically EPROM (EEPROM), hard disk drives, flash drives, memory tapes, cloud memory, or any combination of primary and/or secondary memory that is suitable for performing the operations described herein.

The computer-readable medium 1410 may also be configured to store data 1450. The data 1450 may include streaming data and/or other data used by the container image creation application 1435.

It is to be understood that only some components of the container image creation system 1400 are shown and described in FIG. 14. However, the container image creation system 1400 may include other components such as various batteries and power sources, networking interfaces, routers, switches, external memory systems, controllers, etc. Generally speaking, the container image creation system 1400 may include any of a variety of hardware, software, and/or firmware components that are needed or considered desirable in performing the functions described herein. Similarly, the host device 1405, the input devices 1415, the output devices 1420, and the computer-readable medium 1410, including the memory controller 1440, may include hardware, software, and/or firmware components that are considered necessary or desirable in performing the functions described herein.

Figure 15:
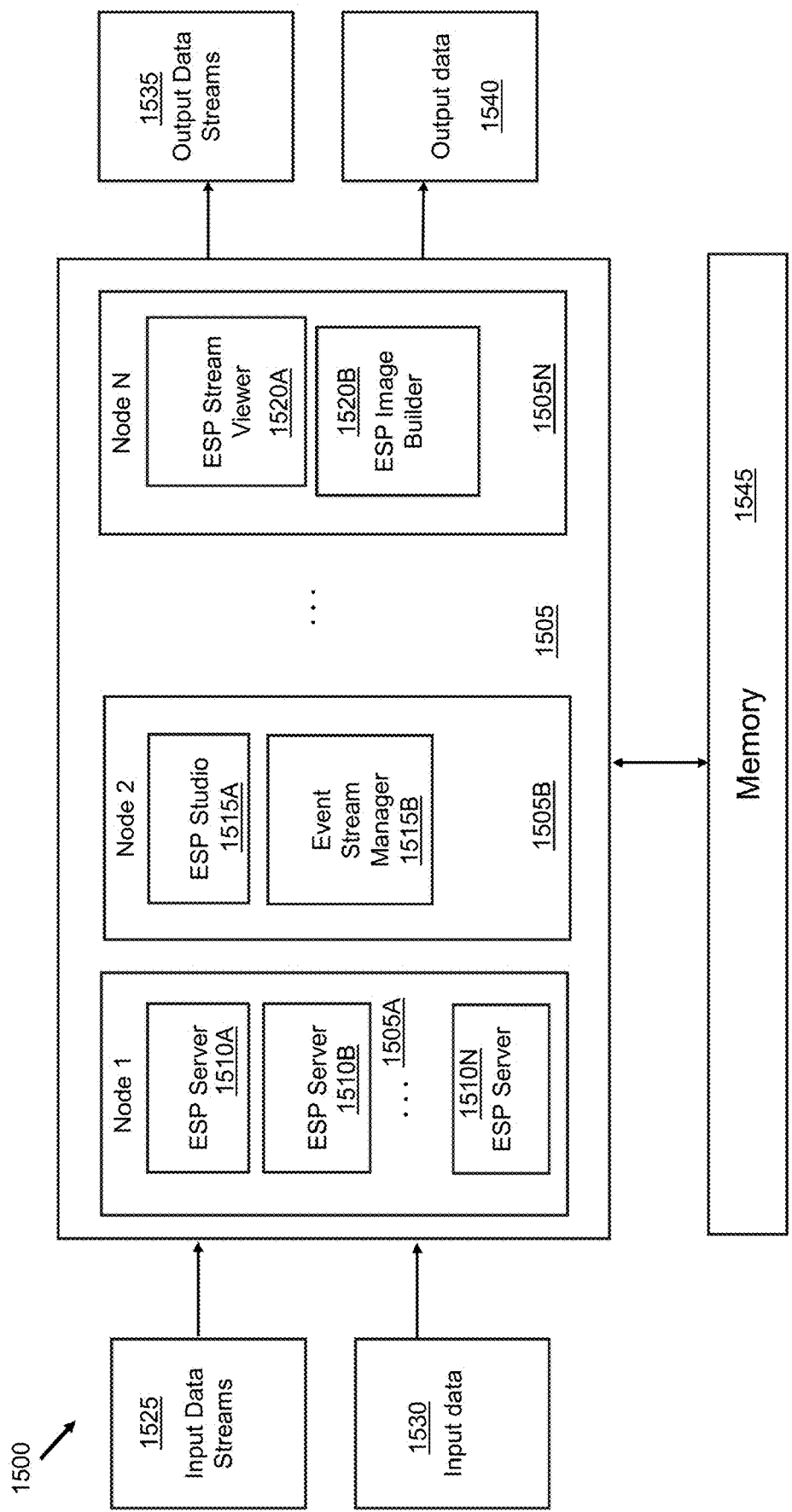
FIG. 15 illustrates a block diagram of an example container cluster, according to embodiments of the present technology.

Turning now to FIG. 15, an example block diagram for a container cluster 1500 is shown, in accordance with some embodiments of the present disclosure. The container image creation system 1400 (or at least portions thereof) may be implemented on the container cluster 1500. In some embodiments, the container cluster 1500 may be a Kubernetes cluster. In other embodiments, the container cluster 1500 may be another type of cluster that is configured to create, execute, and manage containers. Although the container cluster 1500 is described herein as having containers only, in some embodiments, the container cluster may also include virtual machines. The container cluster 1500 may include a plurality of nodes 1505A-1505N (collectively referred to herein as nodes 1505) that may run containerized applications. The nodes 1505, also referred to as hosts or host machines, may be physical or virtual machines to run the containerized applications. Although not shown, in some embodiments, each of the nodes 1505 may include an agent to ensure the containers on the node are running inside of a container pod, a container runtime software to run the containers, and a local control plane to manage network rules and manage communications between the container pods. Each of the nodes 1505 may include other or additional elements that may be needed to perform the functions described herein. Each of the nodes 15050 may be configured to communicate with one another.

Each of the nodes 1505 may include one or more container pods. Each container pod may be considered a smallest deployable unit and may include one or more containers. For example, the node 1505A is shown to have container pods 1510A-1510N, the node 1505B is shown to have container pods 1515A, 1515B, and the node 1505N is shown to have container pods 1520A, 1520B. In other embodiments, the number of container pods on each of the nodes 1505 may vary from that shown.

In some embodiments, one ESP server may run on one container pod and each ESP server may be configured to run one ESP project. Thus, in some embodiments, if the container cluster 1500 is running multiple ESP projects, those ESP projects may be executed on different container pods (of the same or different nodes). For example, as shown, each of the container pods 1510A-1510N is running an ESP server. Although only the node 1505A is shown as running ESP servers, in some embodiments, other or additional nodes may run the ESP server as well. Further, although all the container pods on the node 1505A are shown as running the ESP server, in some embodiments, one or more container pods on that node may run other applications as well.

In some embodiments, the ESP studio running on the container pod 1515A is used to create an ESP project, the ESP event stream manager running on the container pod 1515B is used to deploy a created ESP project, the ESP stream viewer running on the container pod 1520A is used to visualize and monitor data streams processed by the ESP server (e.g., to allow users to see the processed data in real-time), and the ESP image builder running on the container pod 1520B is used to build the ESP server image during runtime. Although the ESP studio and the ESP event stream manager are shown as running on the same node (e.g., the node 1505B), in some embodiments, those components may run on different nodes. Similarly, although the ESP stream viewer and the ESP image builder are shown as running on the same node (e.g., the node 1505N), in some embodiments, those components may run on different nodes.

The nodes 1505 may receive input data streams 1525 and additional input data 1530 for processing. The processed data may be output as output data streams 1535 and other output data 1540. The nodes 1505 may interface with a memory 1545, which may be associated with, or be part of, the computer-readable medium 1410. Although only some components of the cluster 1500 are shown herein, in other embodiments, the cluster and each of the components therein may include other elements that may be needed or considered desirable to have in performing the functions described herein.

Figure 16:
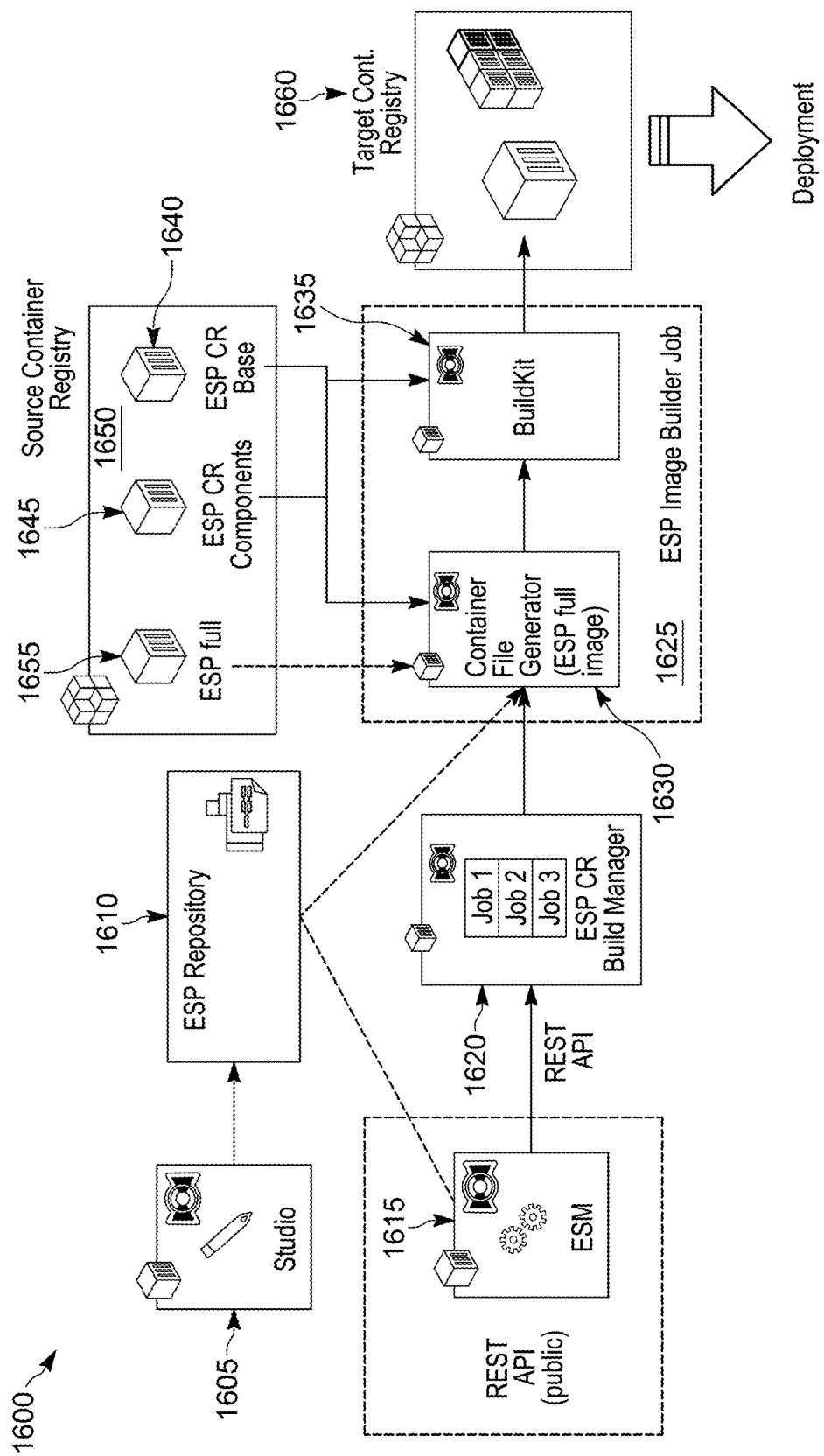
FIG. 16 illustrates a block diagram showing additional details of the container image creation system of FIG. 14, according to embodiments of the present technology.

Turning to FIG. 16, an example block diagram of a container image creation system 1600 is shown, in accordance with some embodiments of the present disclosure. The container image creation system 1600 shows the container image creation system 1400 in greater detail. The container image creation system 1600 is an implementation of the container image creation application 1435. The container image that is generated by the container image creation system 1600 is an ESP project container image for an ESP project. The container image creation system 1600 generates the ESP project container image at runtime during deployment of an ESP project. Thus, the ESP project container image only includes those components that are needed by the ESP server and the ESP project to execute the ESP project and process data in the ESP project.

The container image creation system 1600 includes an ESP studio 1605. The ESP studio 1605 is used to create an ESP project. The ESP studio 1605 is an interactive development environment that may be used to create and edit new ESP projects. To create a new ESP project in the ESP studio 1605, a user may set up a project directory for the new ESP project and initialize the project directory with the necessary configuration files. The user may define the input data streams 1525 (e.g., the data sources from where those input data streams are to come) and the output data streams 1535 (e.g., the data destinations where the processed data streams are to go). The user may also configure various processing elements such as filters, connectors, aggregators, analytical models, etc. to define how the input data streams 1525 are to be processed and transformed. If machine learning models and/or custom scripts are needed for the ESP project, the user may integrate or associate one or more ASTORE files, ONNX files, Python codes/scripts/plugins, etc. with the ESP project. Once the above settings and files have been associated with the ESP project, the user may test the ESP project within the ESP studio 1605 using built-in tools of the ESP studio. For example, in some embodiments, the user may run simulations with sample data to ensure that the ESP project is operating correctly. Once the user is satisfied with the created ESP project, the user may create a project package within the ESP studio 1605.

A project package is a collection of files and configurations that define the ESP project. It includes everything needed to run the ESP project on the ESP server. For example, the project package may include the XML model, the ASTORE, ONNX, Python, parameter, and other files, and any custom logic, connectors, and plugins. In some embodiments, the project package may be organized into folders to help manage resources more efficiently. For example, the project package may be organized into a test files, model files, output files, etc. The project package provides an easier way to deploy and manage the ESP project on the ESP server. The project package does not include an ESP project container image.

Once the ESP project (e.g., the project package for the ESP project) is created in the ESP studio 1605, the ESP studio may send the project package to an ESP repository 1610 for storing. The ESP repository 1610 may be part of, or associated with, the memory 1545 and/or the computer-readable medium 1410. The ESP repository 1610 may be a version-controlled storage location (e.g., Git) where the project package may be stored before deployment. The project package may be versioned in the ESP repository 1610. In particular, in some embodiments, versions of the project package may be created in the ESP studio 1605 and the versioned ESP project package may be sent to the ESP repository 1610. By versioning, changes made to the project package may be tracked over time. Versions of the project package may be made for various computing environments. For example, a first version of the project package may be made for a development environment and another version of the project package may be made for a test environment, and so on. Once the versions are created, the project package may be promoted. Thus, the ESP repository 1610 may enable collaboration, managing changes, and maintaining a history of the project package. The project package may remain the ESP repository 1610 until the ESP project is ready for deployment.

Once the project package has been promoted or is ready for deployment, the project package may be made available in an Event Stream Manager (ESM) 1615. The ESM 1615 may be a web-based client to manage the ESP environment. The ESM 1615 may be used to deploy an ESP project into processing environments (e.g., into production, development, testing, etc. environments), monitor the health of the deployment, monitor the health of the ESP server running the ESP project, monitor the health of the running ESP project, and/or manage changes to the deployment of the ESP project. In some embodiments, the ESM 1615 may manage, monitor, and deploy multiple ESP projects in different processing environments and ESP servers at the same time.

To create an ESP project container image for an ESP project, in some embodiments, the ESM 1615 make an Application Programming Interface (API) call (e.g., a REST call) to a service called ESP container runtime (CR) build manager 1620. By way of the API call, the ESM 1615 provides an input JSON (Java Script Object Notation) to the ESP CR build manager 1620. In some embodiments, the ESM 1615 and the ESP CR build manager 1620 may be integrated into a single component and the integrated component may perform the functions that are described as being performed by the individual components (e.g., the ESM 1615 and the ESP CR build manager 1620) herein. The input JSON contains parameters that may be used by the ESP CR build manager to create a first manifest file (see FIG. 26 for an example of the first manifest file). For example, the input JSON may include parameters to indicate where to get the project package from, name of the ESP project, name of the project package, name of the ESP server image that is to be created, registry from which to source a base image from, registry to which the created ESP server image is to be sent, the platform (e.g., arm or x86) to be used, and/or other indicators that may be desirable to know or needed in creating the ESP server image. Using the input JSON, the ESP CR build manager 1620 may create the first manifest file for the ESP project. The first manifest file is a file in a .yml or .yaml format. In other embodiments, the first manifest file may have other suitable file formats.

The first manifest file may create a job for the ESP project. In some embodiments, each ESP project container image creation may be associated with one job. In some embodiments, these jobs may be queued for execution sequentially. In some embodiments, the first manifest file may include the name of the images which may be needed to run the job. In other words, the first manifest file may include the names of the images which may be needed to create a container file generator and a build kit. In some embodiments, the first manifest file may include three images—a components image and a base image to create a container file generator and a build kit image to create the build kit.

The ESP CR build manager 1620 uses the first manifest file to start an ESP image builder job 1625 on the cluster 1500. The ESP image builder job 1625 may create a container pod that includes a plurality of containers. The ESP image builder job 1625 may be configured to create a container file generator 1630 and a build kit 1635. Thus, in some embodiments, the ESP CR build manager 1620 starts the ESP image builder job 1625 and the ESP image builder job executes container file generator software for the container file generator 1630 and executes a build kit software for the build kit 16335. In some embodiments, the ESP image builder job 1625 creates a container pod for the container file generator 1630 and the build kit 1635. In some embodiments, the container file generator 1630 and the build kit 1635 may be on the same container pod. In some embodiments, the container file generator 1630 may be on a separate container than the build kit 1635 of the same container pod. In some embodiments, the container file generator 1630 and the build kit 1635 are on the same container pod. In some embodiments, the container file generator 1630 and the build kit 1635 are on different container pods. In some embodiments, the container file generator 1630 is a Docker file generator. The container file generator 1630 is configured to generate a list of required software components needed to execute the ESP project. In some embodiments, the container file generator 1630 is also configured to use the list of required software components to generate a container file (e.g., a Docker file). Using the container file, the build kit 1635 then creates the ESP project container image.

In particular, the container file generator 1630 executes an instance of the ESP server on the container started by the ESP image builder job 1625. In some embodiments, the container file generator 1630 executes the ESP server on the same container as the one on which the container file generator software is executing. In other embodiments, the container file generator 1630 may execute the ESP server instance on another container started by the ESP image builder job 1625. The container file generator 1625 may instantiate a full ESP server image 1655. The full ESP server image 1655 may include all of the 96 Linux package manager components (and their libraries and files). The container file generator 1625 may execute the full ESP server image 1655 included therein to execute the ESP server instance.

Additionally, the container file generator 1630 may disable data streaming to the executing ESP server instance. By disabling data streaming to the ESP server instance, the container file generator 1630 ensures that no data processing is performed by the ESP server. Disabling data streaming means that data is not being processed by the ESP server. In particular, in some embodiments, disabling data streaming may mean that no data is being generated by the data sources (e.g., the input data streams 1525 and the input data 1530 have been disabled at the data sources such that the input data streams are not being generated). In some embodiments, disabling data streaming may mean that the input data streams 1525 and the input data 1530 is being generated and transmitted to the ESP server. However, the ESP server is not processing the streamed data.

Responsive to disabling data streaming, the ESP project is executed on the ESP server instance and the container file generator 1630 identifies all the main and child processes loaded by the ESP project on the ESP server. In some embodiments, the container file generator 1630 may make a system call to run the ESP server instance. In response to the system call, the container file generator 1630 may receive a process identifier (e.g., process ID). The process ID may be associated with the main processes. Using the process ID, the container file generator 1630 may then make another system call to determine the child processes running inside the main processes. In addition, the container file generator 1630 identifies all the software libraries loaded by the ESP server for each of the main and child processes. Based on the identified main and child processes, as well as the software libraries of each of the main and child processes, the container file generator 1630 generates the list of required components. The list of required components includes all of the identified software libraries for each of the main and child processes. By identifying all of the main and child process libraries that are loaded by the ESP server during execution of the ESP project, the container file generator 1630 may use a second manifest file (e.g., shown in FIG. 19) to map the libraries to corresponding Linux packages and identify exactly which of the 96 Linux package manager components are needed by the ESP server in executing the ESP project.

Figure 17:
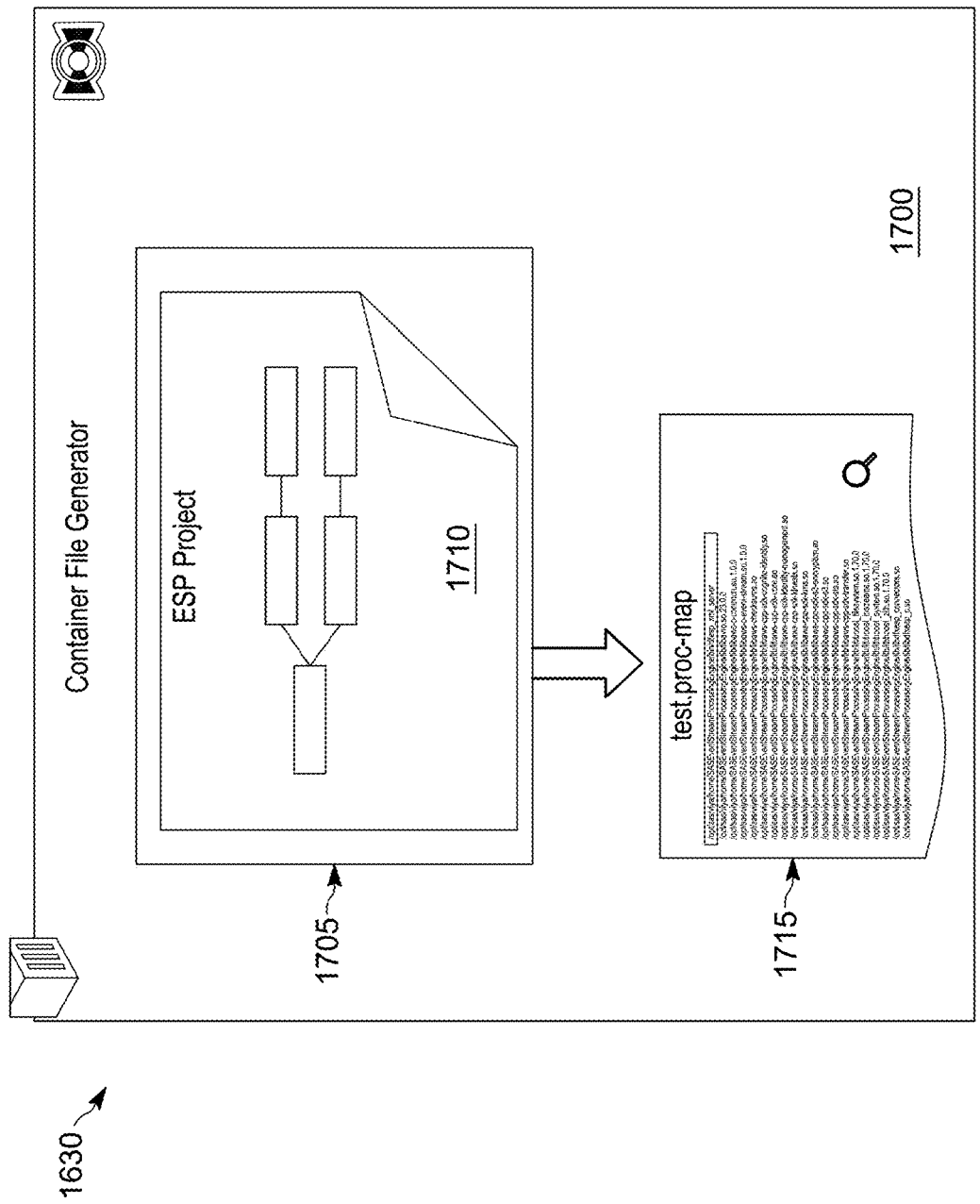
FIG. 17 illustrates a block diagram of an example container file generator of the container image creation system of FIG. 14, according to embodiments of the present technology.

Referring to FIG. 17 in conjunction with FIG. 16, an example of the container file generator 1630 is shown, in accordance with some embodiments of the present disclosure. The container file generator 1630 is shown installed on a container 1700. The container 1700 is part of the ESP image builder job 1625. The container file generator 1630 executes an ESP server 1705 on the container 1700 and the ESP server executes an ESP project 1710. Data streaming to the ESP server 1705 and the ESP project 1710 is disabled. Responsive to disabling the data streaming, the container file generator 1630 creates a list of required components 1715, an exported snippet of which is shown in FIG. 18. The list of required components 1715 incudes a list of software libraries that are required by each of the main and child processes loaded by the ESP server 1705 during execution of the ESP project 1710 when data streaming is disabled. In some embodiments, the list of software libraries includes a file name/location of each software library. In some embodiments, the list of software libraries may also include other information for each software library.

Figure 19:
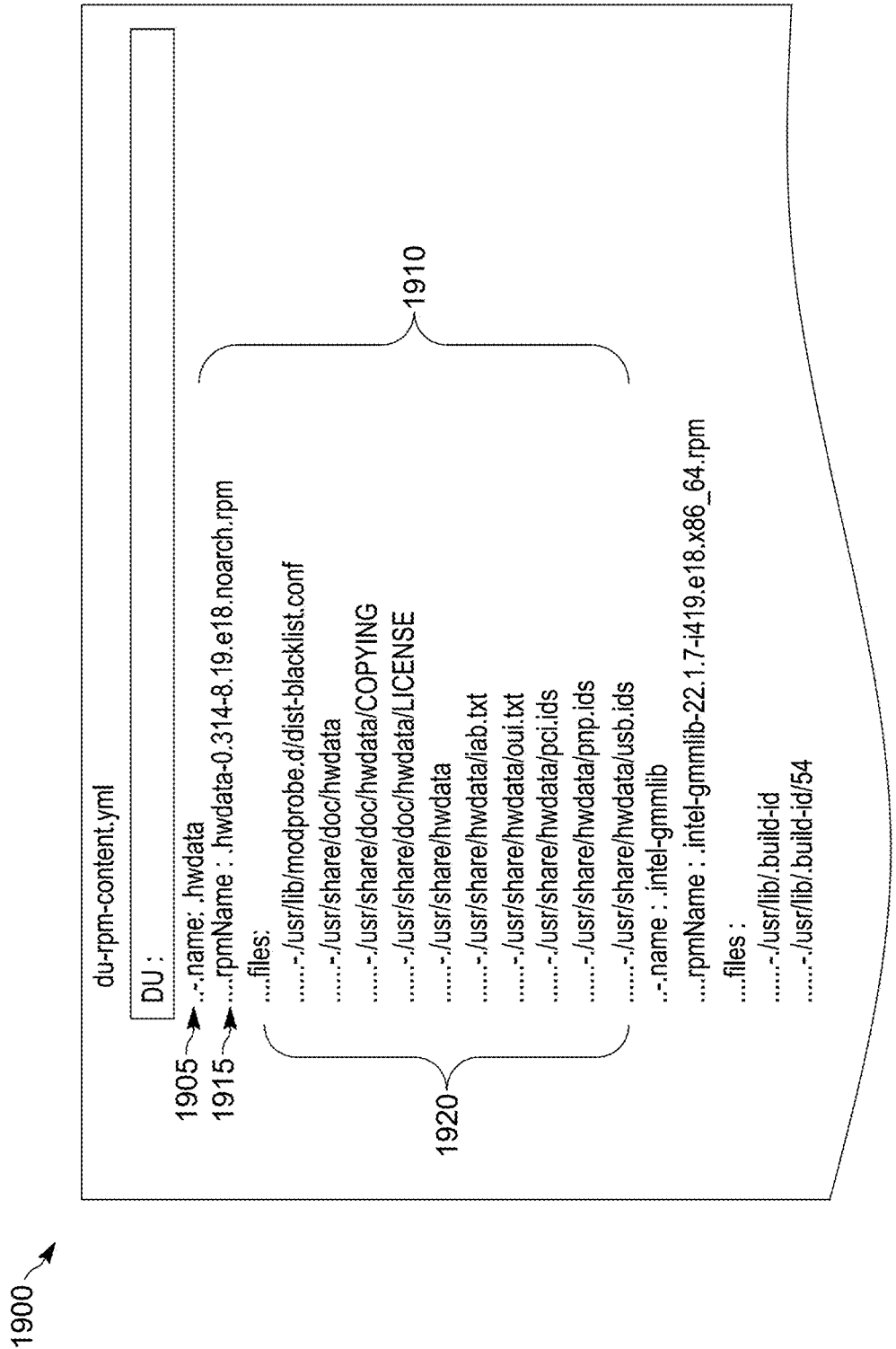
FIG. 19 illustrates an example of a second manifest file, according to embodiments of the present technology.

In addition to generating the list of required components 1715, the container file generator 1630 generates a container file 2000 (see FIG. 20). The container file 2000 may be a Docker file. To generate the container file 2000, the ESP image builder job 1625 copies a second manifest file from an ESP CR components image 1645 and provides it to the container file generator 1630 which also receives the project package from the ESP repository 1610. An example of a portion of the ESP CR components image 1645 is shown in FIG. 19. Referring to FIG. 19 in conjunction with FIG. 16, the ESP CR components image 1645 may include a second manifest file 1900. For each of the 96 Linux package manager components, this second manifest file 1900 includes a condensed name 1905 of a Linux package manager component 1910, a full name/location 1915 of the Linux package manager component, and file names/locations 1920 of all the libraries and files that are part of that Linux package manager component. The second manifest file 1900 only shows details of one Linux package manager component. Similarly, the second manifest file 1900 may include the details of all other 95 Linux package manager components.

The container file generator 1630 may generate the container file 2000 (e.g., the du-rpm-content.yml file) from the second manifest file 1900 and the list of required components 1715. Specifically, to generate the container file 2000, the container file generator 1630 identifies a Linux package manager component from the plurality of Linux package manager components in the second manifest file 1900 that contains the software libraries in the list of required components 1715. More specifically, for each software library in the list of required components 1715, the container file generator 1630 determines from the second manifest file 1900 which Linux package manager component contains that software library. Upon identifying the Linux package manager component containing that software library, the container file generator 1630 adds the file name 1915 of that Linux package manager component into the container file 2000. Thus, the container file 2000 only includes the file names of those Linux package manager components that are required by the ESP server 1705 to execute the ESP project 1710. The container file generator 1630 may then send the container file 2000 to the build kit 1635.

The build kit 1635 generates an ESP project container image from the container file 2000. To create the ESP project container image, the build kit 1635 receives a base image 1640 and the ESP component image 1645 from a source container registry 1650. The base image 1640 is a foundational layer for a container image. The base image 1640 may include a minimal set of files and configurations needed to run the ESP server. For example, the base image 1640 may include operating system files, a package manager to allow execution of additional software on the ESP server, essential software libraries, default configuration files for the operating system and installed packages, and basic command-line tools and utilities that may be needed by all ESP projects. In other embodiments, the base image 1640 may include other or additional foundational components. The ESP components image 1645 is an image that includes all of the 96 Linux package manager components (and their libraries and files)—a portion of which is shown in FIG. 19. The base image 1640 and the ESP components image 1645 are stored within the source container registry 1650. The source container registry 1650 is a service that stores and distributes container images and related artifacts. It may be considered a central repository to store the container images. In some embodiments, the source container registry 1650 may be part of the ESP repository 1610. The build kit 1635 may combine the base image 1640 with the ESP components image 1645 to obtain an ESP server image.

Figure 21:
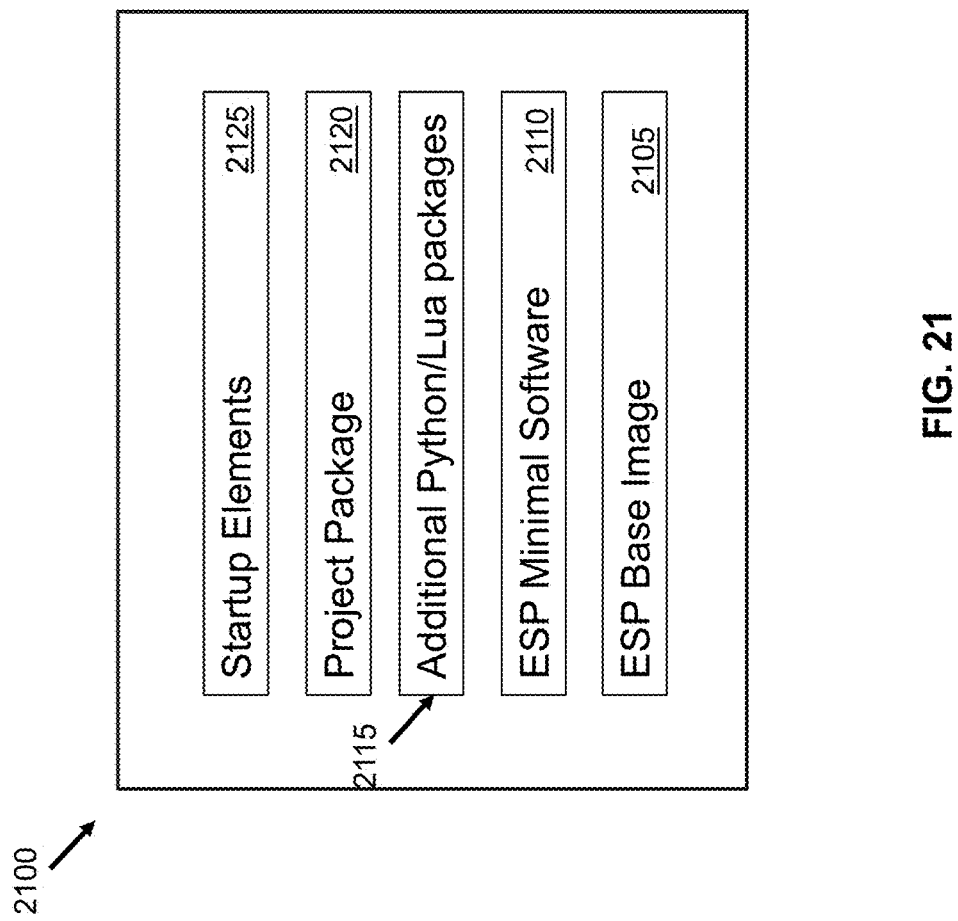
FIG. 21 illustrates an example of an ESP project container image, according to embodiments of the present technology.

In particular, the build kit 1635 may combine the base image 1640 with all of the Linux package manager components mentioned in the container file 2000 from the ESP component image 1645. In some embodiments, the build kit 1635 may combine the base image 1640 with the ESP components image 1645 adding the Linux package manager components mentioned in the container file 2000 from the ESP components image 1645 as a layer on top of the base image 1640. In other embodiments, the build kit 1635 may combine the base image 1640 with the ESP components image 1645 in other ways. In some embodiments, the build kit 1635 may store the created ESP project container image in the source container registry 1650. The created ESP project container image may then be used to analyze data by the ESP project. An example of an ESP project container image is shown in FIG. 21. The build kit 1635 may also send the ESP project container image to a target container registry 1660 for deployment of the ESP project 1710.

Turning to FIG. 21, an example of ESP project container image 2100 is shown, in accordance with some embodiments of the present disclosure. The ESP project container image 2100 includes a plurality of layers. The base or the bottommost layer of the ESP project container image 2100 is a base image 2105. The base image 2105 is analogous to the base image 1640. The base image 2105 is a very lightweight image, including only minimal and foundational components. On top of the base image 2105, the build kit 1635 adds additional layers based on the Linux package manager components in the container file 2000. For example, the ESP project container image 2100 includes an ESP minimal software layer 2110, additional Python/Lua packages layer 2115, a project package layer 2120, and a startup elements layer 2125. The ESP minimal software layer 2110 includes all of the required Linux package manager components. The Python/Lua packages layer 2115 includes the Python or Lua code for external modules that the ESP project may use/need. The project package layer 2120 includes the project package components from the ESP repository 1610. The startup elements layer 2125 includes configurations and environment components such an entry point of the containers, etc.

Because the ESP project container image 2100 includes all of the components required to execute the ESP server 1705 and the ESP project 1710 (and includes only the required Linux package manager components, not all of the 96 Linux package manager components), the ESP project container image is a fully stand-alone self-contained immutable container image. The ESP project container image 2100 is a lightweight Open Container Initiative (OCI) compliant container image that combines essential system files and ESP software with the complete ESP model/project components. Accordingly, ESP projects may be deployed with all their components as an ESP project container image built and published on-demand. The same ESP project container may be run on a variety of computing environments, such as the Cloud, on-premises, or at the Edge. Using the ESP project container image 2100, containers for executing the ESP projects may be created on x86_64 or Arm64 architectures and on multiple ESP versions. Further, the ESP project container image 2100 supports all the ESP features, including high scalability, as well as custom Python packages or Lua Rocks and custom base images. The ESP project container image 2100 stays fully compatible with current ESP architecture and designs.

Figure 22:
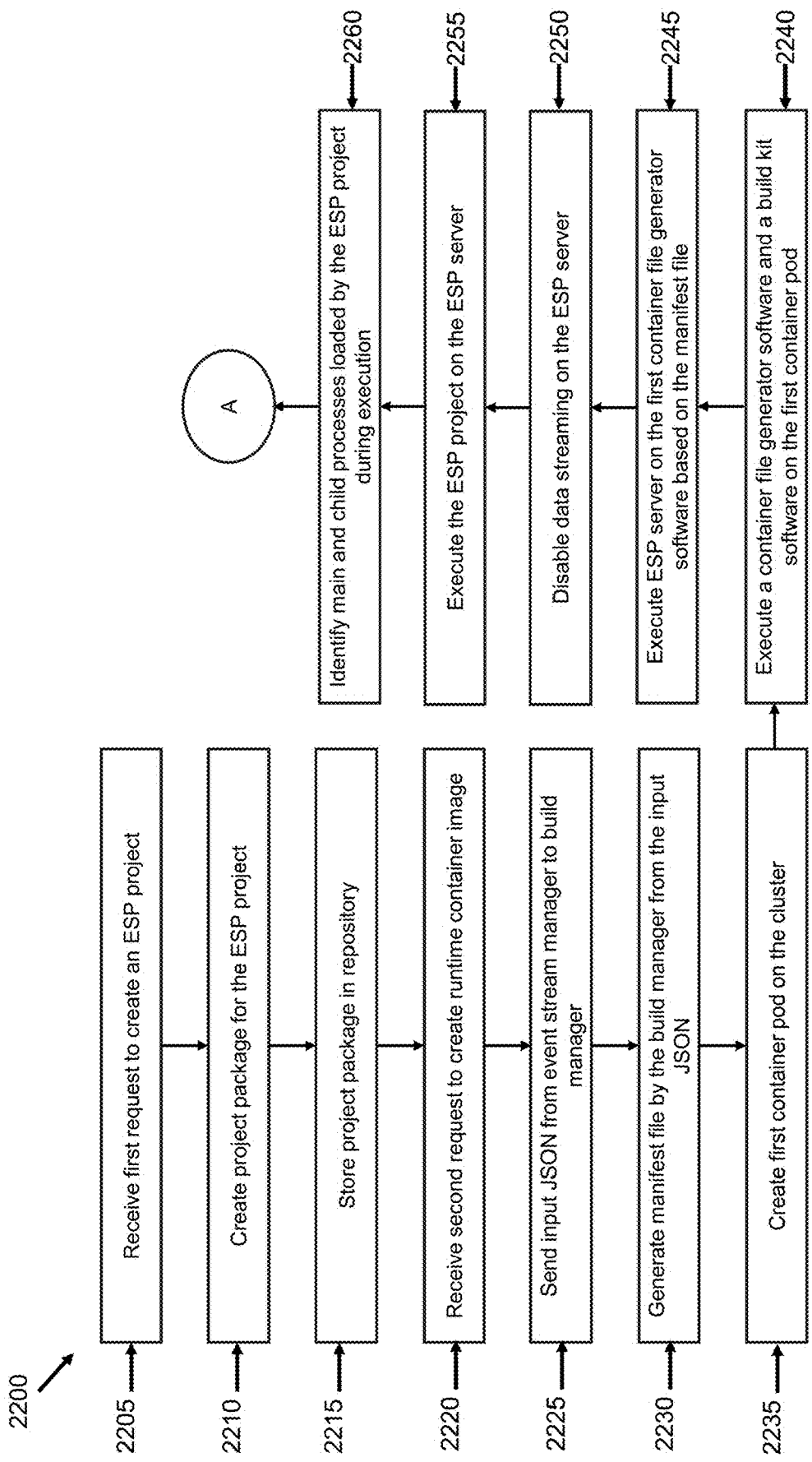
FIG. 22 illustrates a flowchart outlining an example process for creating the ESP project container image of FIG. 21, according to embodiments of the present technology.
Figure 22:
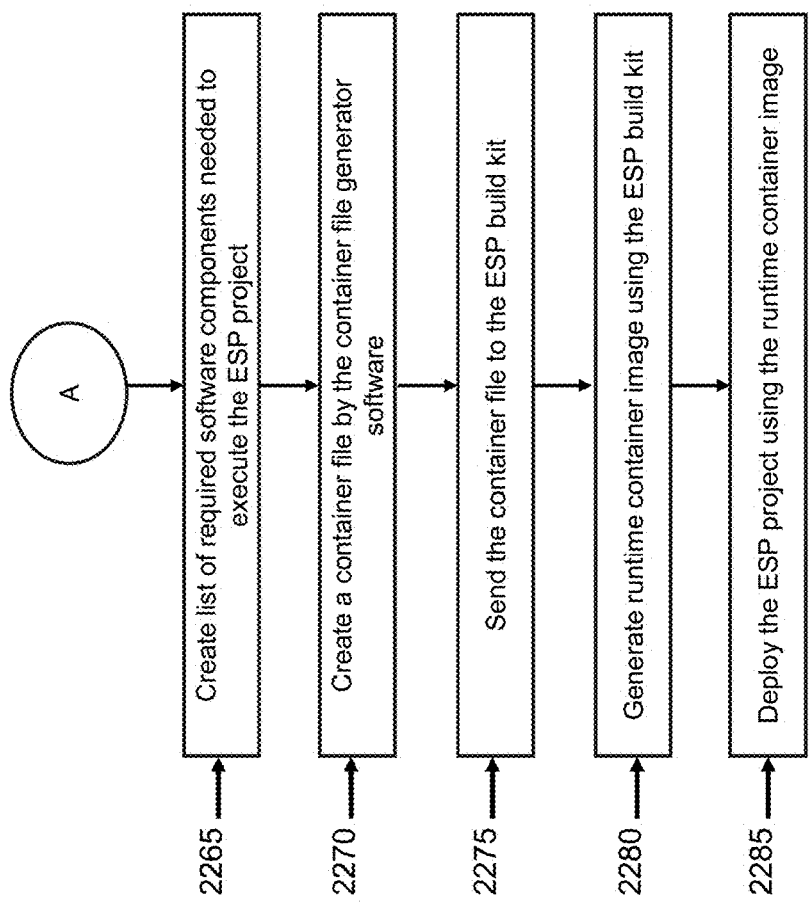

Referring to FIG. 22, an example flowchart outlining the operations of a process 2200 is shown, in accordance with some embodiments of the present disclosure. The process 2200 is used to create an ESP project container image. The process 2200 may be executed by one or more processors (e.g., the processor 1430) executing computer-readable instructions (e.g., the container image creation computer-readable instructions 1445) stored on a computer-readable medium (e.g., the computer-readable medium 1410). The process 2200 may be implemented by the container image creation application 1435. In other embodiments, the process 2200 may include other or additional operations.

At operation 2205, the processor receives a first request to create an Event Stream Processing (ESP) project. The first request may be received by the ESP studio 1605. For example, in some embodiments, the ESP studio 1605 may receive a request to create a new ESP project via a user interface. In other embodiments, the ESP studio 1605 may receive the first request in other ways. At operation 2210, the processor creates a project package for the ESP project in response to the first request. In particular, the ESP studio 1605 creates the project package responsive to receiving the first request. At operation 2215, the processor stores the project package in the ESP repository 1610. In particular, the ESP studio 1605 sends the project package to the ESP repository 1610 where the project package may be stored before deployment. In addition, the project package may be versioned as necessary within the ESP repository 1610.

At operation 2220, the processor receives a second request to create a runtime ESP project container image for the ESP project. In some embodiments, the second request may also be a request to run the ESP project. For example, in some embodiments, the second request may be a request to deploy the ESP project. The second request may be received by way of promoting the project package from the ESP repository 1610. When the project package is promoted, the project package becomes available in the ESM 1615. Additionally, upon promoting the project package, the ESM 1615 may make a REST API call and send an input JSON to the ESP CR build manager 1620 at operation 2225. At operation 2230 and responsive to receiving the second request, the processor (e.g., the ESP CR build manager 1620) generates the first manifest file from the input JSON. The first manifest file includes the images to create the ESP image builder job 1625.

At operation 2235, the processor 2235 (e.g., the ESP image builder job 1625) creates a first container pod on one of the nodes 1505 of the cluster 1500. In particular, the ESP CR build manager 1620 starts the ESP image builder job 1625, which then starts a container pod on one of the nodes 1505 of the cluster 1500 based on the first manifest file. The container pod includes two containers that are run one after another by the ESP image builder job 1625. At operation 2240, the processor executes a container file generator software for the container file generator 1630 and a build kit software for the build kit 1635 on the containers started by the ESP image builder job 1625. In particular, the ESP image builder job 1625 starts two containers. On the first container, the ESP image builder job 1625 executes the container file generator software for the container file generator 1630 and on the second container, the ESP image builder job executes the build kit software for the build kit 1635.

At operation 2245, the processor executes an ESP server using the container file generator software on the container on which the container file generator software is executed. The processor executes the full ESP server image 1655 using the container file generator software to execute the ESP server.

At operation 2250, the processor disables data streaming on the ESP server. In some embodiments, the processor may disable data streaming before executing the ESP server. Responsive to disabling the data streaming, at operation 2255, the processor executes the ESP project on the ESP server such that data is not streaming to the ESP server during execution of the ESP project. The ESP project may be executed based on the full ESP server image 1655. However, because no data is streaming to the ESP server, no data analysis or predictions or insights, etc., are performed and no output data streams are generated.

At operation 2260, the processor identifies all of the main and child processes that are loaded by the ESP project during execution of the ESP project. The processor also identifies all software libraries loaded by the ESP server for each of the main and child processes. Based on the main and child processes, as well as their associated libraries and files, the processor creates a list of all the software libraries that are loaded by each of the main and child processes at operation 2265. This list includes all of the required software components needed to execute the ESP project.

At operation 2270, the processor creates the container file 2000 by the container file generator software. The container file 2000 includes a subset of software components based on the list of required software components created at the operation 2265 and the second manifest file 1900 provided by ESP components image 1645. In particular, the container file generator may receive (or retrieve) the ESP components image 1645. From the ESP components image 1645, the container file generator may obtain the second manifest file 1900. The container file generator may then use the second manifest file to generate the container file 2000. Creating the container file 2000 is discussed in more detail in FIG. 24.

At operation 2275, the container file generator 1630 sends the container file 2000 to the build kit 1635. At operation 2280, the processor generates the ESP project container image 2100 using the build kit software of the build kit 1635. The build kit software may create the ESP project container image for the ESP project based on the container file received at the operation 2275, the base image 1640 received (or retrieved) from the source container registry 1650, and the ESP component image 1645 received (or retrieved) from the source container registry. Creation of the ESP project container image 2100 is discussed in more detail in FIG. 25. The ESP project container image 2100 is an ESP server image that includes only those Linux package manager components that are required by the ESP server 1705 to run the ESP project 1710. At operation 2285, the processor runs the ESP project using the ESP project container image to analyze data streamed to the ESP project. In particular, the build kit 1635 sends the ESP project container image of the operation 2280 to the target container registry 1660.

Figure 23:
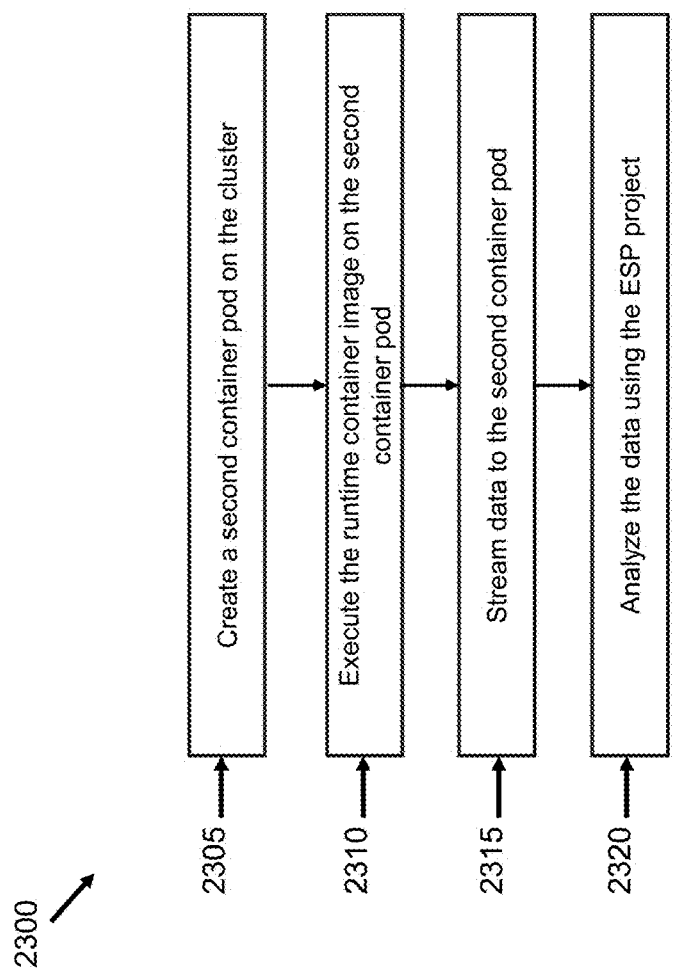
FIG. 23 illustrates a flowchart outlining an example process for deploying an ESP project using the ESP project container image created by the process of FIG. 22, according to embodiments of the present technology.

Referring to FIG. 23, an example flowchart outlining the operations of a process 2300 is shown, in accordance with some embodiments of the present disclosure. The process 2300 is used to deploy the ESP project 1710 using the ESP project container image generated using the process 2200. The process 2300 may be executed by one or more processors (e.g., the processor 1430) executing computer-readable instructions (e.g., the container image creation computer-readable instructions 1445) stored on a computer-readable medium (e.g., the computer-readable medium 1410). The process 2300 may be implemented by the container image creation application 1435. In other embodiments, the process 2300 may include other or additional operations.

At operation 2305, the processor creates a second container pod on the cluster 1500 upon creating the ESP project container image using the process 2200. In some embodiments, the second container pod may be on the same node as the node on which the container file generator 1630 is located. In other embodiments, the second container pod may be on another node. The second container pod may include the ESP project container image for the ESP project to be deployed. At operation 2310, the processor executes the ESP project container image on the second container pod to run the ESP server on the second container pod. The ESP project 1710 may be run on the ESP server. At operation 2315, the processor streams the data to the second container pod. In particular, data streaming that was disabled at the operation 2250 may be enabled. In some embodiments, the data streaming may be enabled after creation of the container file 2000. In some embodiments, the data streaming may be enabled after creation of the ESP project container image. In some embodiments, data streaming may have been disabled only to the ESP server 1705 and the container pod on which the ESP server is located. Because a new container pod (e.g., the second container pod) is created for deploying the project, data streaming may already be enabled. The streamed data to the second container pod may then be analyzed using the ESP project.

Figure 24:
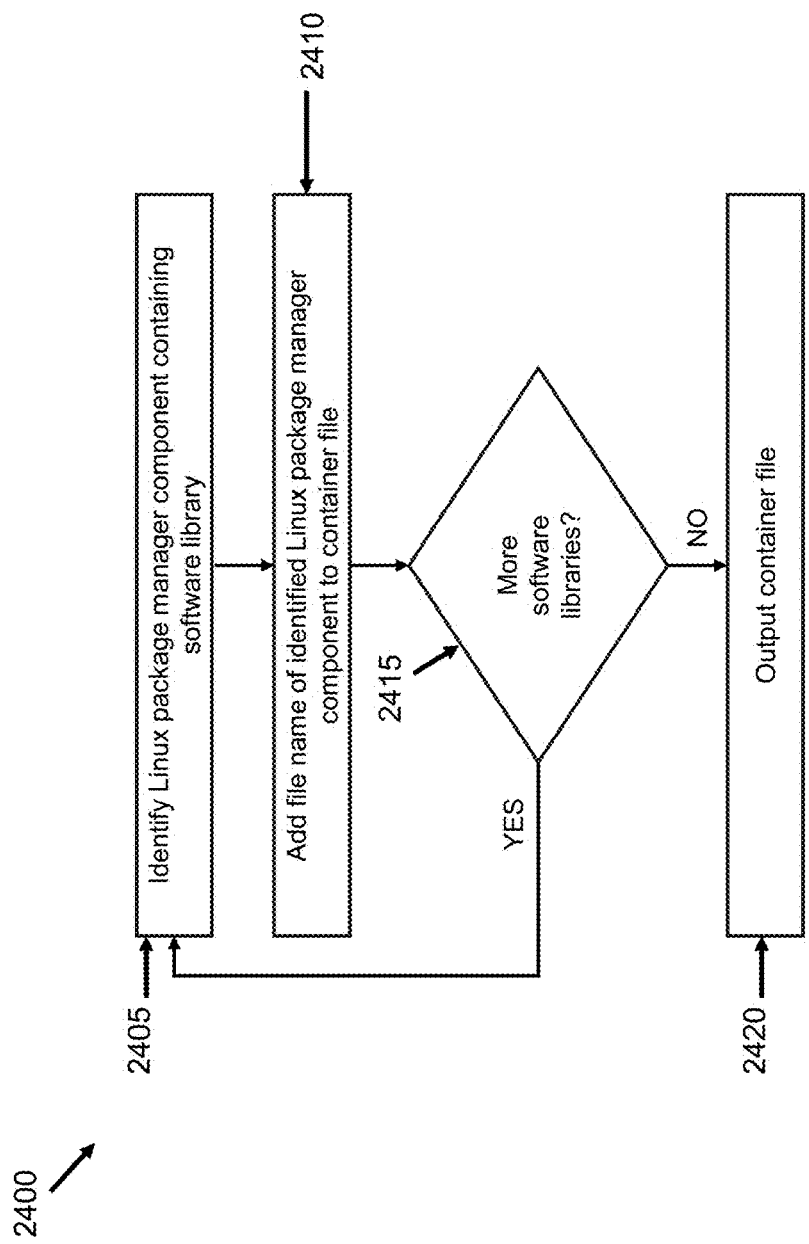
FIG. 24 illustrates a flowchart outlining an example process for creating a container file during the process of FIG. 22, according to embodiments of the present technology.

Referring to FIG. 24, an example flowchart outlining the operations of a process 2400 is shown, in accordance with some embodiments of the present disclosure. The process 2400 is used to create the container file 2000 at the operation 2270 of the process 2200. The process 2400 may be executed by one or more processors (e.g., the processor 1430) executing computer-readable instructions (e.g., the container image creation computer-readable instructions 1445) stored on a computer-readable medium (e.g., the computer-readable medium 1410). The process 2400 may be implemented by the container image creation application 1435. In other embodiments, the process 2400 may include other or additional operations.

At operation 2405, for a software library included in the list of required elements 1715 created at the operation 2265, the processor identifies each of the Linux package manager components from the second manifest file 1900 that contains the software library. At operation 2410, the processor adds a file name/location associated with each of the identified Linux package manager components to a container file (e.g., the container file 2000). In some embodiments, the processor may create a new instance of the container file for each ESP project. At operation 2415, the processor determines if the list of required elements 1715 includes additional software libraries. If yes, the process 2400 loops back to the operation 2405 to identify the Linux package manager components for that software library and add the file names of those Linux package manager components to the container file. When the Linux package manager components of all the software libraries in the list of required elements 1715 have been identified, the processor outputs the container file 2000 at operation 2420.

Figure 25:
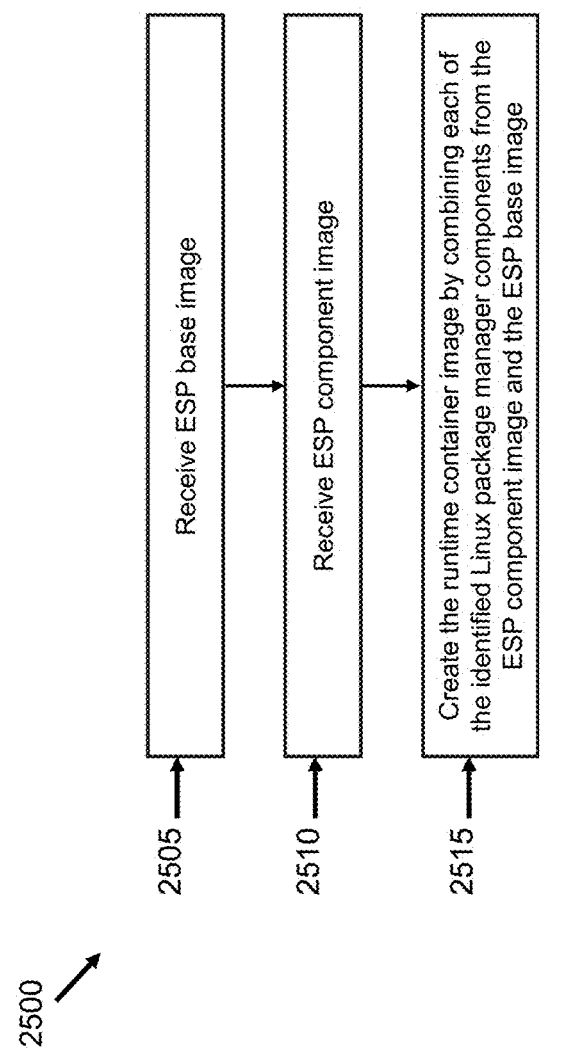
FIG. 25 illustrates a flowchart outlining an example process for creating the ESP project container image in more detail, according to embodiments of the present technology.

Referring to FIG. 25, an example flowchart outlining the operations of a process 2500 is shown, in accordance with some embodiments of the present disclosure. The process 2500 is used to create the ESP project container image 2100 at the operation 2280 of the process 2200. The process 2500 may be executed by one or more processors (e.g., the processor 1430) executing computer-readable instructions (e.g., the container image creation computer-readable instructions 1445) stored on a computer-readable medium (e.g., the computer-readable medium 1410). The process 2500 may be implemented by the container image creation application 1435. In other embodiments, the process 2500 may include other or additional operations.

At operation 2505, the processor receives (or retrieves) the ESP base image (e.g., the base image 1640. At operation 2510, the processor receives (or retrieves) the ESP component image 1645 including the plurality of Linux package manager components. At operation 2515, the processor creates the ESP project container image 2100 by combining each of the Linux package manager components from the ESP component image 1645 and the base image 1640. In particular, for each Linux package manager component identified in the container file 2000, the processor may retrieve that Linux package manager component from the ESP component image 1645 and add that Linux package manager component as a layer on top of the base image 1640.

Thus, the present disclosure provides a mechanism to create size optimized ESP project container images that may be used to deploy ESP projects. Each ESP project container image is optimized for the particular ESP project. Thus, only the software components that are needed by the ESP project (and the ESP server on which the ESP project is running) are included in the ESP project container image, thereby dynamically creating container images instead of using static container images. Table 1 below shows differences of size when generic (e.g., conventional) container images are used to run an ESP project compared to when the proposed ESP project container image is used to run the same ESP project:

TABLE 1

| Image | Size | Description |
| --- | --- | --- |
| sas-event-stream-processing-server-app | 10.5 GB | Current generic full ESP server image with all the libraries installed |
| sas-esp-server-edge | 1.93 GB | Current smallest size of a generic base image for Edge processing |
| sas-esp-server-edge-analytics | 4.63 GB | Current generic base image for Edge analytics |
| joindemo-x86_64 | 1.35 GB | Proposed ESP project container image having only required components |
| Svdd-x86_64 | 1.48 GB | Proposed ESP project container image for ESP project using a trained SVDD model for data analytics |
| Kmeans_streaming_algorithm | 1.38 GB | Proposed ESP project container image for analyzing data using kmeans clustering algorithm |

Table 1 above shows that the proposed approach is better in terms of image size compared to the conventional images. The first row of Table 1 shows the size of the ESP server image when a conventional full ESP server image (e.g., an image having all of the 96 Linux package manager components) is used. Rows 2 and 3 of Table 1 show the size of a generic base image for different situations. The ESP project would be layered on top of this base image, which would increase the size even more. The bottom 3 rows of Tale 1 show the ESP server image created using the proposed approach. Even the smallest size of the conventional base image is bigger than the ESP project container images of the proposed approach. By tailoring the ESP project container image, the size of the ESP project container image is significantly reduced while providing all of the advantages discussed above.

The herein described subject matter illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the disclosure be defined by the claims appended hereto and their equivalents. The word "illustrative" is used herein to mean serving as an example, instance, or illustration. Any aspect or design described herein as "illustrative" is not necessarily to be construed as preferred or advantageous over other aspects or designs.

What is claimed is:

1. A non-transitory computer-readable medium comprising computer-readable instructions stored thereon that when executed by a processor cause the processor to:
    receive a first request to create an Event Stream Processing (ESP) project;
    create a project package for the ESP project in response to the first request;
    receive a second request to create an ESP project container image for the ESP project;
    responsive to receiving the second request, generate a first manifest file from the project package, wherein the first manifest file comprises information for at least one or more images for executing a container file generator software and a build kit software;
    create a first container pod on a cluster based on the first manifest file;
    execute a container file generator software and a build kit software on the first container pod;
    execute an ESP server on the container file generator software;
    execute the ESP project on the ESP server, wherein data is not streaming to the ESP server during execution of the ESP project;
    responsive to executing the ESP project on the ESP server, identify a list of required software components needed to execute the ESP project;
    create a container file by the container file generator software, wherein the container file comprises a subset of software components based on the list of required software components;
    generate the ESP project container image for the ESP project by the build kit software for the ESP project based on the container file; and
    run the ESP project using the ESP project container image to analyze data streamed to the ESP project.

2. The non-transitory computer-readable medium of claim 1, wherein to run the ESP project using the ESP project container image, the computer-readable instructions further cause the processor to:

create a second container pod on the cluster, the second container pod comprising the ESP project container image;
execute the ESP project container image on the second container pod;
stream the data to the second container pod; and
analyze the data using the ESP project.

3. The non-transitory computer-readable medium of claim 1, wherein the container file comprises a list of Linux package manager components required to run the ESP project.

4. The non-transitory computer-readable medium of claim 3, wherein the list of required software components comprises a plurality of software libraries.

5. The non-transitory computer-readable medium of claim 4, wherein to create the container file, the computer-readable instructions further cause the processor to:
for each software library of the plurality of software libraries, identify a Linux package manager component from a second manifest file that contains the software library; and
add a file name associated with the identified Linux package manager component to the container file.

6. The non-transitory computer-readable medium of claim 5, wherein to generate the ESP project container image for the ESP project, the computer-readable instructions further cause the processor to:
receive an ESP base image; receive an ESP component image comprising the plurality of Linux package manager components; and
create the ESP project container image by combining each of the identified Linux package manager components from the ESP component image and the ESP base image.

7. The non-transitory computer-readable medium of claim 1, wherein the first manifest file is in a .yml or .yaml format.

8. The non-transitory computer-readable medium of claim 1, wherein the ESP project container image comprises:
an ESP base image;
an ESP software required to run the ESP project;
the project package; and
at least one configuration or environment variable for autonomous runtime of the ESP project.

9. The non-transitory computer-readable medium of claim 1, wherein to identify the list of required software components, the computer-readable instructions further cause the processor to:
identify main and child processes loaded by the ESP project on the ESP server; and
identify all software libraries loaded by the ESP server for each of the main and child processes.

10. The non-transitory computer-readable medium of claim 9, wherein the computer-readable instructions further cause the processor to:
generate the list of required software components, wherein the list comprises the softwam libraries that are identified;
create the container file by the container file generator software using the list of required software components; and
send the container file to the build kit, wherein the build kit creates the ESP project container image.

11. A system comprising:
a memory having computer-readable instructions stored thereon; and
a processor that executes the computer-readable instructions to:
receive a first request to create an Event Stream Processing (ESP) project;
create a project package for the ESP project in response to the first request;
receive a second request to create an ESP project container image for the ESP project;
responsive to receiving the second request, generate a first manifest file from the project package, wherein the first manifest file comprises information for at least one or more images for executing a container file generator software and a build kit software;
create a first container pod on a cluster based on the first manifest file;
execute a container file generator software and a build kit software on the first container pod;
execute an ESP server on the container file generator software;
execute the ESP project on the ESP server, wherein data is not streaming to the ESP server during execution of the ESP project; responsive to executing the ESP project on the ESP server, identify a list of required software components needed to execute the ESP project;
create a container file by the container file generator software, wherein the container file comprises a subset of software components based on the list of required software components;
generate the ESP project container image for the ESP project by the build kit software for the ESP project based on the container file; and
run the ESP project using the ESP project container image to analyze data streamed to the ESP project.

12. The system of claim 11, wherein to deploy the ESP project using the ESP project container image, the computer-readable instructions further cause the processor to:
create a second container pod on the cluster, the second container pod comprising the ESP project container image;
execute the ESP project container image on the second container pod;
stream the data to the second container pod; and
analyze the data using the ESP project.

13. The system of claim 11, wherein the container file comprises a list of Linux package manager components required to run the ESP project.

14. The system of claim 13, wherein the list of required software components comprises a plurality of software libraries.

15. The system of claim 14, wherein to create the container file, the computer-readable instructions further cause the processor to:
for each software library of the plurality of software libraries, identify a Linux package manager component from a second manifest file that contains the software library; and
add a file name associated with the identified Linux package manager component to the container file.

16. The system of claim 15, wherein to generate the ESP project container image for the ESP project, the computer-readable instructions further cause the processor to:
receive an ESP base image;
receive an ESP component image comprising the plurality of Linux package manager components; and
create the ESP project container image by combining each of the identified Linux package manager components from the ESP component image and the ESP base image.

17. The system of claim 11, wherein the manifest file is in a .yml or .yaml format.

18. The system of claim 11, wherein the ESP project container image comprises:
   an ESP base image;
   an ESP software required to run the ESP project;
   the project package; and
   at least one configuration or environment variable for autonomous runtime of the ESP project.

19. The system of claim 11, wherein to identify the list of required software components, the computer-readable instructions further cause the processor to:
   identify main and child processes loaded by the ESP project on the ESP server; and
   identify all software libraries loaded by the ESP server for each of the main and child processes.

20. The system of claim 19, wherein the computer-readable instructions further cause the processor to:
   generate the list of required software components, wherein the list comprises the all of the software libraries that are identified;
   create the container file by the container file generator software using the list of required software components; and
   send the container file to the build kit, wherein the build kit creates the ESP project container image.

21. A method comprising:
   receiving, by a processor executing computer-readable instructions stored on a memory, a first request to create an Event Stream Processing (ESP) project;
   creating, by the processor, a project package for the ESP project in response to the first request;
   receiving, by the processor, a second request to create an ESP project container image for the ESP project;
   responsive to receiving the second request, generating, by the processor, a first manifest file from the project package, wherein the first manifest file comprises information for at least one or more images for executing a container file generator software and a build kit software;
   creating, by the processor, a first container pod on a cluster based on the first manifest file;
   executing, by the processor, a container file generator software and a build kit software on the first container pod;
   executing, by the processor, an ESP server on the container file generator software;
   executing, by the processor, the ESP project on the ESP server, wherein data is not streaming to the ESP server during execution of the ESP project;
   responsive to executing the ESP project on the ESP server, identifying, by the processor, a list of required software components needed to execute the ESP project;
   creating, by the processor, a container file by the container file generator software, wherein the container file comprises a subset of software components based on the list of required software components;
   generating, by the processor, the ESP project container image for the ESP project by the build kit software for the ESP project based on the container file; and
   deploying, by the processor, the ESP project using the ESP project container image to analyze data streamed to the ESP project.

22. The method of claim 21, wherein to deploy the ESP project using the ESP project container image, the method further comprises:
   creating, by the processor, a second container pod on the cluster, the second container pod comprising the ESP project container image;
   executing, by the processor, the ESP project container image on the second container pod;
   streaming, by the processor, the data to the second container pod; and
   analyzing, by the processor, the data using the ESP project.

23. The method of claim 21, wherein the container file comprises a list of Linux package manager components required to run the ESP project.

24. The method of claim 23, wherein the list of required software components comprises a plurality of software libraries.

25. The method of claim 24, wherein to create the container file, the method further comprises:
   for each software library of the plurality of software libraries, identifying, by the processor, a Linux package manager component from a second manifest file that contains the software library; and
   adding, by the processor, a file name associated with the identified Linux package manager component to the container file.

26. The method of claim 25, further comprising:
   receiving, by the processor, an ESP base image;
   receiving, by the processor, an ESP component image comprising the plurality of Linux package manager components; and
   creating, by the processor, the ESP project container image by combining each of the identified Linux package manager components from the ESP component image and the ESP base image.

27. The method of claim 21, wherein the manifest file is in a .yml or .yaml format.

28. The method of claim 21, wherein the ESP project container image comprises:
   an ESP base image;
   an ESP software required to run the ESP project;
   the project package; and
   at least one configuration or environment variable for autonomous runtime of the ESP project.

29. The method of claim 21, wherein to identify the list of required software components, the method further comprises:
   identifying, by the processor, main and child processes loaded by the ESP project on the ESP server; and
   identifying, by the processor, all software libraries loaded by the ESP server for each of the main and child processes.

30. The method of claim 29, further comprising:
   generating, by the processor, the list of required software components, wherein the list comprises the all of the software libraries that are identified;
   creating, by the processor, the container file by the container file generator software using the list of required software components; and
   sending, by the processor, the container file to the build kit, wherein the build kit creates the ESP project container image.

* * * * *